(12) United States Patent
Reeves

(10) Patent No.: US 9,586,667 B2
(45) Date of Patent: Mar. 7, 2017

(54) SPLICE ASSEMBLY FOR JOINING STRUCTURAL COMPONENTS

(71) Applicant: The Boeing Company, Chicago, IL (US)

(72) Inventor: Andrew C. Reeves, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/557,812

(22) Filed: Dec. 2, 2014

(65) Prior Publication Data

US 2016/0152317 A1 Jun. 2, 2016

(51) Int. Cl.
*B64C 1/06* (2006.01)
*B64C 1/12* (2006.01)

(52) U.S. Cl.
CPC .............. *B64C 1/069* (2013.01); *B64C 1/061* (2013.01); *B64C 1/064* (2013.01); *B64C 1/12* (2013.01); *Y10T 29/49622* (2015.01)

(58) Field of Classification Search
CPC ......... B64C 1/069; B64C 1/068; B64C 1/064; B64C 1/06; B64C 3/182; B64C 3/18; Y10T 403/1616; Y10T 403/1624
See application file for complete search history.

(56) References Cited

U.S. PATENT DOCUMENTS

| | | |
|---|---|---|
| 6,105,902 A | 8/2000 | Pettit |
| 7,938,367 B2 * | 5/2011 | Jarsaillon ................ B64C 1/068 244/131 |
| 8,500,068 B2 * | 8/2013 | Villares ................... B64C 1/069 244/131 |

(Continued)

FOREIGN PATENT DOCUMENTS

| | | |
|---|---|---|
| AT | 400 390 B | 12/1995 |
| EP | 2 727 821 A1 | 5/2014 |

(Continued)

OTHER PUBLICATIONS

European Patent Office, Extended European Search Report, EP 15 19 6204 (May 6, 2016).

*Primary Examiner* — Tien Dinh
*Assistant Examiner* — Richard R Green
(74) *Attorney, Agent, or Firm* — Walters & Wasylyna LLC

(57) ABSTRACT

A splice assembly may include a first splice bracket including first longitudinal axis, a first connecting member, and a first mating member extending from the first connecting member along the first longitudinal axis, the first mating member including a first mating surface disposed as a non-zero first angle relative to the first longitudinal axis. The disclosed slice assembly may further include a second splice bracket including second longitudinal axis, a second connecting member, and a second mating member extending from the second connecting member along the second longitudinal axis, the second mating member including a second mating surface disposed as a non-zero second angle relative to the second longitudinal axis. The first mating surface and the second mating surface are complementary. Surface contact between the first mating surface and the second mating surface defines a fastening location for connecting the first splice bracket and the second splice bracket.

21 Claims, 25 Drawing Sheets

(56) References Cited

U.S. PATENT DOCUMENTS

| | | | |
|---|---|---|---|
| 8,993,097 B2 * | 3/2015 | Kwon | B64C 1/064 |
| | | | 428/174 |
| 2008/0210819 A1 | 9/2008 | Jarsaillon et al. | |
| 2010/0116938 A1 * | 5/2010 | Kline | B29C 65/5042 |
| | | | 244/131 |
| 2012/0043449 A1 | 2/2012 | Jacob | |
| 2013/0181092 A1 | 7/2013 | Cacciaguerra et al. | |
| 2014/0117157 A1 | 5/2014 | Diep et al. | |
| 2014/0263836 A1 | 9/2014 | Guillemaut et al. | |
| 2014/0353426 A1 * | 12/2014 | De Ruffray | B64C 1/064 |
| | | | 244/119 |

FOREIGN PATENT DOCUMENTS

| | | |
|---|---|---|
| FR | 2 566 812 A2 | 1/1986 |
| GB | 641 432 A | 8/1950 |

* cited by examiner

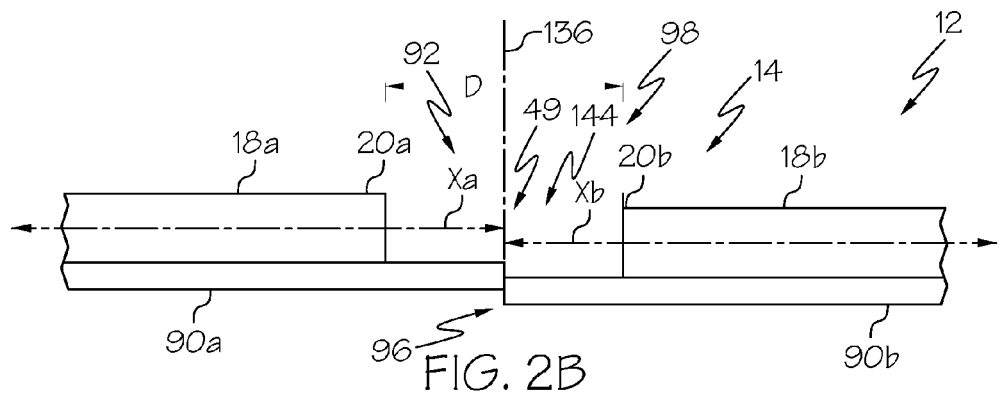
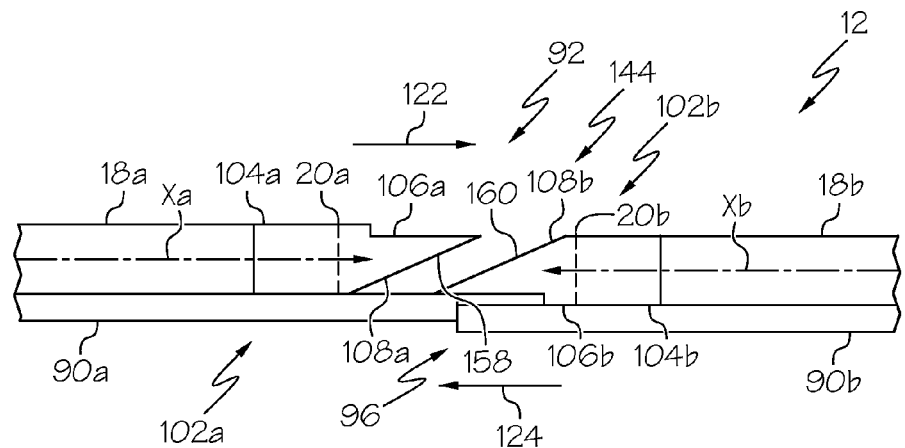
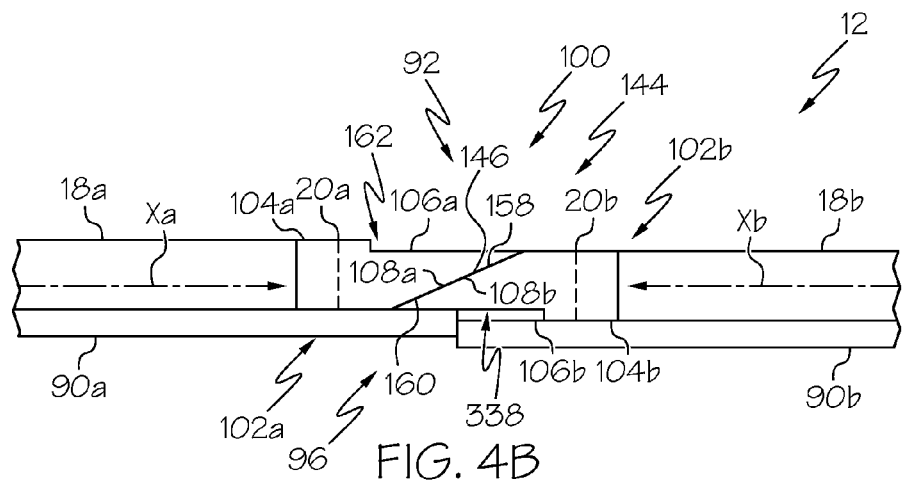

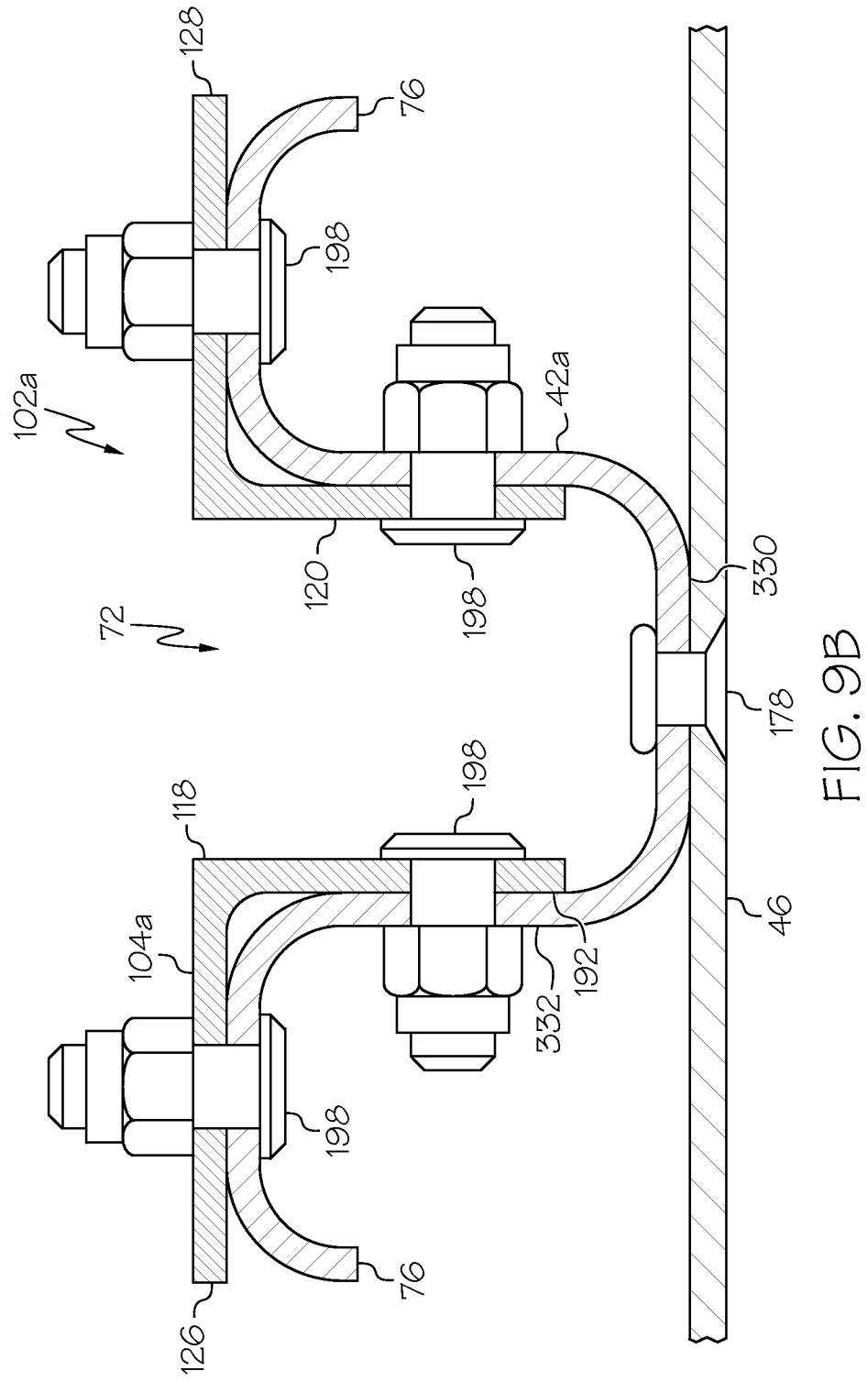

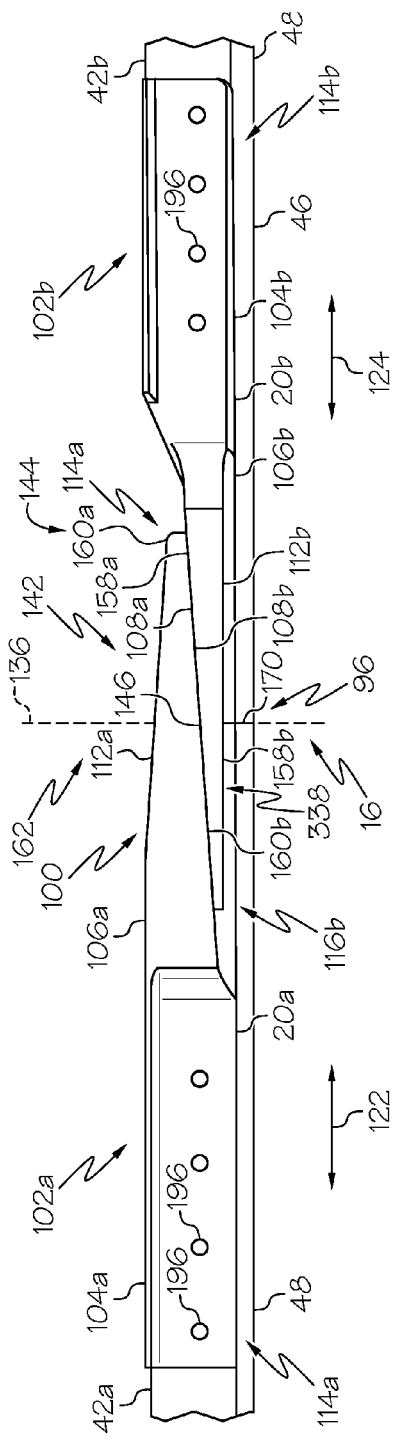
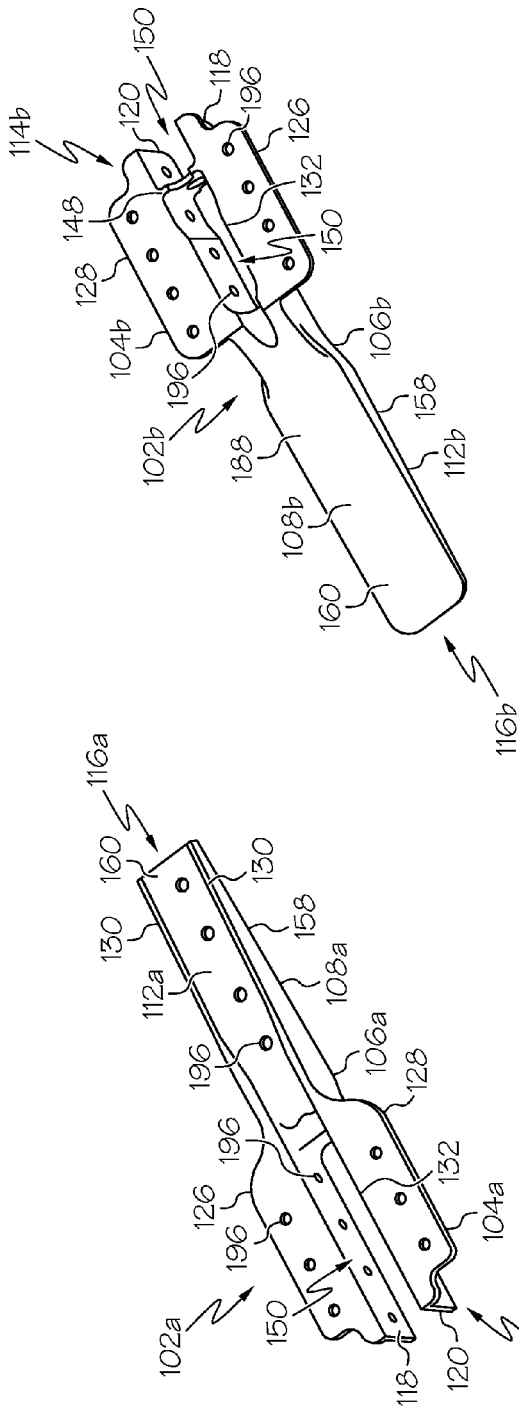
FIG. 15
FIG. 16
FIG. 17

SPLICE ASSEMBLY FOR JOINING STRUCTURAL COMPONENTS

FIELD

The present disclosure is generally related to apparatus and methods for joining components and, more particularly, to apparatus and methods for adjustably joining structural components of a vehicle, for example, stringers of an aircraft.

BACKGROUND

In manufacturing of a vehicle, structure components may be joined together forming a joint. In some traditional joints, splice joints are used in which an end portion of one structural component may be butted up to, or spliced together with, an adjacent end portion of another structural component and joined using fasteners, such as bolts and rivets and/or devices, such as ribs, brackets or splice plates.

As one example, a body of an aircraft is typically constructed as a series of spaced circumferential fuselage frames (e.g., hoop-wise frames) that define the general cross sectional shape of the aircraft, with a series of spaced stringer members (e.g., stringers) running longitudinally with respect to the aircraft body between fuselage frames. The fuselage frames and stringers provide structural support for the aircraft skin, which is formed of a series of separate pieces applied over the various structural support members and joined together. When joining stringers together at a splice joint, a one-piece stringer splice plate may interconnect the end portions of adjacent stringers to form a stringer splice assembly.

However, in many instances, adjacent stingers may not be suitably aligned to accommodate connection of the stringer splice plate. Such nonalignment may require use of tooling to align the stringers on either side of the splice joint. Following alignment, the stingers and the stinger splice plate are clamped in place, various shims are fabricated and placed around the stringer splice assembly, and fastening holes are fabricated in the stingers and the stringer splice plate. Following fabrication of the fastening holes, the stringer splice assembly is disassembled, deburred, and any required sealant is applied. The stringer splice assembly may then be reassembled and fastened together.

Disadvantageously, this process may result in less than desired completed products at greater than desired fabrication time and costs.

Accordingly, those skilled in the art continue with research and development efforts in the field of joining structural components.

SUMMARY

In one embodiment, the disclosed splice bracket may include a longitudinal axis, a connecting member configured to be connected to an end of a structural component, and a mating member extending from the connecting member along the longitudinal axis, the mating member includes a mating surface disposed at a non-zero angle relative to the longitudinal axis.

In another embodiment, the disclosed splice assembly may include a first splice bracket including first longitudinal axis, a first connecting member, and a first mating member extending from the first connecting member along the first longitudinal axis, the first mating member including a first mating surface disposed as a non-zero first angle relative to the first longitudinal axis. The disclosed slice assembly may further include a second splice bracket including second longitudinal axis, a second connecting member, and a second mating member extending from the second connecting member along the second longitudinal axis, the second mating member including a second mating surface disposed as a non-zero second angle relative to the second longitudinal axis. The first mating surface and the second mating surface are complementary. Surface contact between the first mating surface and the second mating surface defines a fastening location for connecting the first splice bracket and the second splice bracket.

In another embodiment, the disclosed method for joining structural components may include the steps of: (1) associating a first splice bracket relative to a first structural component, (2) associating a second splice bracket relative to a second structural component, (3) positioning at least one of the first splice bracket relative to the first structural component and the second splice bracket relative to the second structural component, (4) connecting the first splice bracket and the second splice bracket together, (5) connecting the first splice bracket to the first structural component, and (6) connecting the second splice bracket to the second structural component.

In yet another embodiment, the disclosed method for directing a load through structural components of a shell structure may include the steps of: (1) conveying at least part of the load from a first structural component to a first splice bracket connected to the first structural component, reacting to at least part of the load from the first splice bracket to a second splice bracket connected to the first splice bracket through a splice bracket connection between a first mating surface of the first splice bracket in surface contact with a second mating surface of the second splice bracket, and (3) conveying the at least part of the load from the second splice bracket to a second structural component connected to the second splice bracket.

Other embodiments of the disclosed apparatus and method will become apparent from the following detailed description, the accompanying drawings and the appended claims.

BRIEF DESCRIPTION OF THE DRAWINGS

FIG. 2B is a schematic side elevational view of another embodiment of structural components of FIG. 1 nonaligned within a second reference plane;

FIG. 3B is a schematic side elevational view of another embodiment of the splice brackets of FIG. 1 at a first linear position relative to the structural components of FIG. 2B;

FIG. 4B is a schematic side elevational view of the splice brackets of FIG. 3B at a second linear position relative to the structural components of FIG. 2B;

FIG. 9B is a schematic end view, in section, of the splice assembly of FIG. 9A;

FIG. 15 is a schematic side elevational view of another embodiment of the splice assembly of FIG. 1;

FIG. 16 is a schematic top perspective view of another embodiment of the splice bracket of FIG. 1;

FIG. 17 is a schematic top perspective view of another embodiment of the splice bracket of FIG. 1.

DETAILED DESCRIPTION

Figure 1:
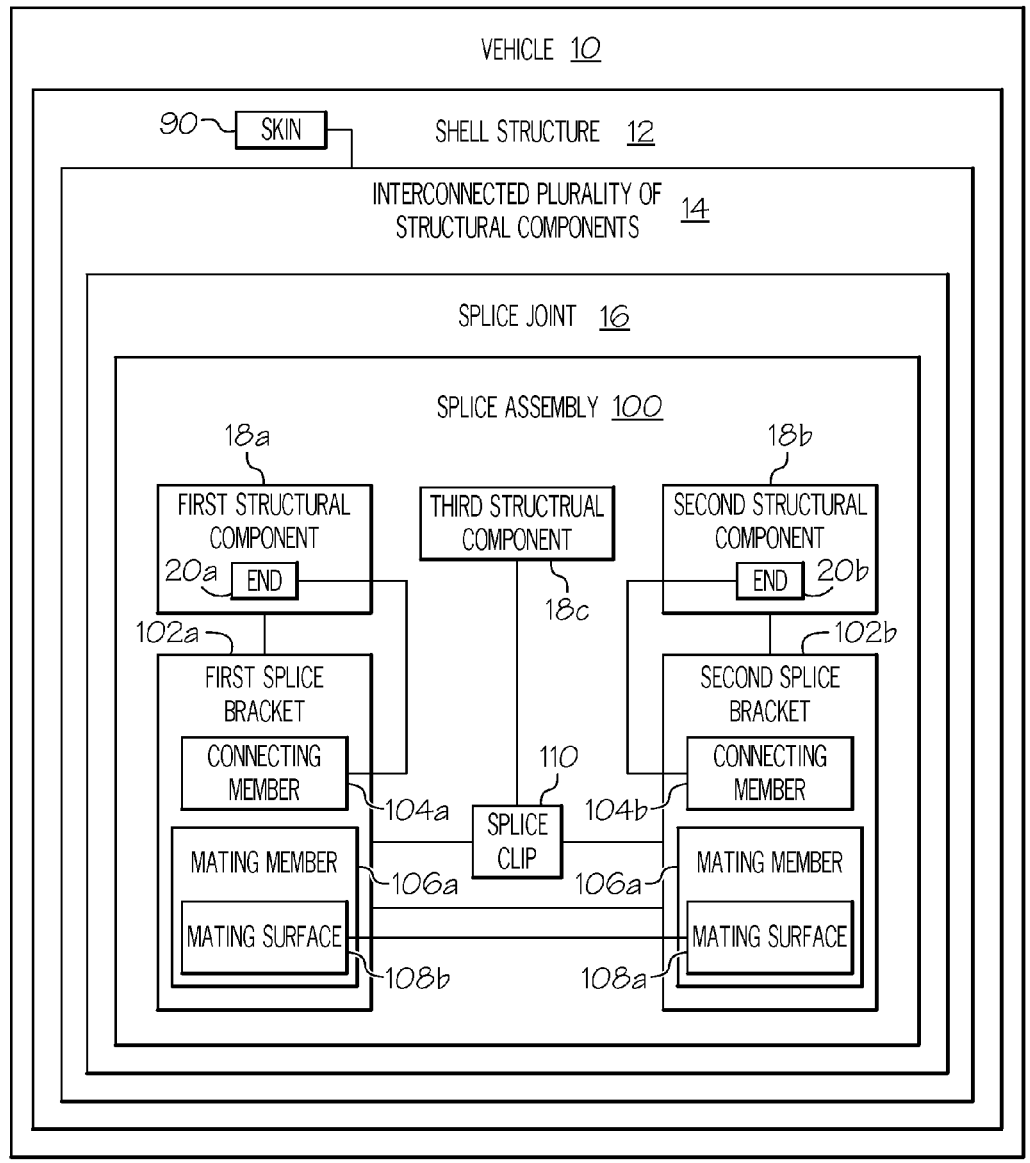
FIG. 1 is a block diagram of one embodiment of the disclosed splice assembly.

The following detailed description refers to the accompanying drawings, which illustrate specific embodiments of the disclosure. Other embodiments having different structures and operations do not depart from the scope of the present disclosure. Like reference numerals may refer to the same element or component in the different drawings.

Referring to FIG. 1, one embodiment of the disclosed splice assembly, generally designated 100, for interconnecting a plurality of structural components 14 of a vehicle 10 may include a pair of splice brackets 102 (referred to individually as a first splice bracket 102a and a second splice bracket 102b). The vehicle 10 may include a shell structure 12 (e.g., a vehicle frame support structure) including the interconnected plurality of structural components 14 and a skin 90 connected to the plurality of structural components 14. For example, the vehicle 10 may be a monocoque structural that supports loads through the skin 90. At least two adjacent structural components 18 (e.g., a first structural component 18a and a second structural component 18b) of the interconnected plurality of structural components 14 may be connected together with the pair of splice brackets 102 to form the disclosed splice assembly 100. One or more splice assemblies 100 (e.g., interconnecting structural components 14) may form a splice joint 16.

Referring briefly to FIGS. 2A-4A, 2B-4B, 2C-4C and 2D-4D as one example, the first structural component 18a and the second structural component 18b may be generally aligned in an end-to-end orientation 92, such that an end 20a of the first structural component 18a may be generally spaced apart 94 from an end 20b of the second structural component 18b. The pair of splice brackets 102a, 102b may interconnect the ends 20a, 20b of the structural components 18a, 18b, as best illustrated in FIGS. 4A, 4B, 4C and 4D.

FIGS. 2A-4A and 2C-4C illustrate top plan views of the shell structure 12 and splice assembly 100 forming the splice joint 16 (FIG. 1). As used herein and with reference to FIGS. 2A-4A, 2C-4C, 9, 10, 14, and 18, the top view illustrates a view looking at a major surface of the skins 90a, 90b (e.g., skin panels 48) to which the structural components 18a, 18b (e.g., stringers 42a, 42b) are connected. For example, the top view includes any orientation of the shell structure 12 (e.g., the skins 90a, 90b and structural components 18a, 18b and skin panels 48 and stringers 42a, 42b) looking from inboard to outboard of the vehicle 10 (FIG. 1) (e.g., the aircraft 22).

FIGS. 2B-4B and 2D-4D illustrate side elevational views of the shell structure 12 and splice assembly 100 forming the splice joint 16 (FIG. 1). As used herein and with reference to FIGS. 2B-4B, 2D-4D, 11, and 15, the side view illustrates a view looking at a side surface of the skins 90a, 90b (e.g., skin panels 48). For example, the side view includes any orientation of the shell structure 12 (e.g., the skins 90a, 90b and structural components 18a, 18b and skin panels 48 and stringers 42a, 42b) looking along the major surface of the skins 90a, 90b (e.g., skin panels 48) to which the structural components 18a, 18b (e.g., stringers 42a, 42b) are connected.

Referring back to FIG. 1, in one example embodiment, the splice assembly 100 may include at least one splice clip 110 configured to be connected between the splice brackets 102a, 102b and a third structural component 18c of the interconnected plurality of structural components 14 to join the first structural component 18a and the second structural component 18b to the third structural component 18c.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of a lower-numbered item (e.g., a "first" item) and/or a higher-numbered item (e.g., a "third" item).

Referring to FIGS. 2A, 2B, 2C and 2D (referred to collectively as FIGS. 2A-2D), in one example embodiment, the first structural component 18a may be connected to a first skin 90a of the shell structure 12 and the second structural component 18b may be connected to a second skin 90b of the shell structure 12. The first skin 90a and the second skin 90b may be butted up 96 to one another. The first structural component 18a and the second structural component 18b may be generally arranged in an end-to-end orientation 92 (e.g., end 20a of the first structural component 18a may be generally in proximity to end 20b of the second structural component 18b). For example, the first structural component 18a and the second structural component 18b may be spaced apart a distance D (FIGS. 2A-2D).

Those skilled in the art will recognize that in certain implementations, the first skin 90a and the second skin 90a may not be in complete contact (e.g., touching) along an entire length of the splice joint 16 (FIG. 1) when butted up 96 together. Those skilled in the art will also recognize that any gaps defined between butted up 96 skins 90a, 90b may be filled (e.g., with shims, fillers, etc.) or otherwise dealt with.

Referring still to FIGS. 2A-2D, in one example construction, the distance D between the first structural component 18a and the second structural component 18b may be sufficient to accommodate interconnection of the splice brackets 102a, 102b (FIGS. 3A-3D and 4A-4D) and/or the third structural component 18c (FIG. 1) positioned therebetween. As one example, the first structural component 18a and the second structural component 18b may be positioned to define a space 49 (FIGS. 2A-2D) between adjacent ends 20a, 20b sufficient to receive the splice brackets 102a, 102b (FIGS. 3A-3D and 4A-4D) and/or the third structural component 18c (not shown in FIGS. 3A-3D and 4A-4D).

Referring still to FIGS. 2A-2D, the first structural component 18a and the second structural component 18b may each include a longitudinal (e.g., center) axis X (referred to individually as axis Xa and axis Xb, respectively). Upon positioning 98 of the first structural component 18a and the second structural component 18b (e.g., upon butting up 96 the first skin 90a and the second skin 90b), the first structural component 18a and the second structural component 18b may one of aligned 138 within a (e.g., first) reference plane 134 (FIG. 2C) (e.g., longitudinal axis Xa and longitudinal axis Xb may be aligned 138 within the reference plane 134), aligned 140 within a (e.g., second) reference plane 136 (FIG. 2D) (e.g., longitudinal axis Xa and longitudinal axis Xb may be aligned 140 within the reference plane 136), nonaligned 142 along the first reference plane 134 (FIG. 2A) (e.g., longitudinal axis Xa and longitudinal axis Xb may be nonaligned 142 within the reference plane 134), nonaligned 144 along the second reference plane 136 (FIG. 2B) (e.g., longitudinal axis Xa and longitudinal axis Xb may be nonaligned 144 within the reference plane 134), or nonaligned 144 along the first reference plane 134 and the second reference plane 136.

As used herein, "aligned" means that when the first structural component 18a and the second structural component 18b are positioned 98 relative to each other (e.g., upon butting up 96 the first skin 90a and the second skin 90b), the first structural component 18a and the second structural component 18b are arranged (e.g., aligned) in a straight line (e.g., longitudinal axis Xa and longitudinal axis Xb are co-linear) or otherwise have a nonalignment magnitude of approximately zero inches.

As used herein, "nonaligned" means that when the first structural component 18a and the second structural component 18b are positioned 98 relative to each other (e.g., upon butting up 96 the first skin 90a and the second skin 90b), the first structural component 18a and the second structural component 18b are not arranged (e.g., not aligned) in a straight line (e.g., longitudinal axis Xa and longitudinal axis Xb are not co-linear) or otherwise have a nonalignment magnitude greater than zero inches.

As used herein, "nonalignment magnitude" means a linear distance between longitudinal axis Xa and longitudinal axis Xb measured perpendicularly to longitudinal axis Xa and longitudinal axis Xb.

Figure 2A:
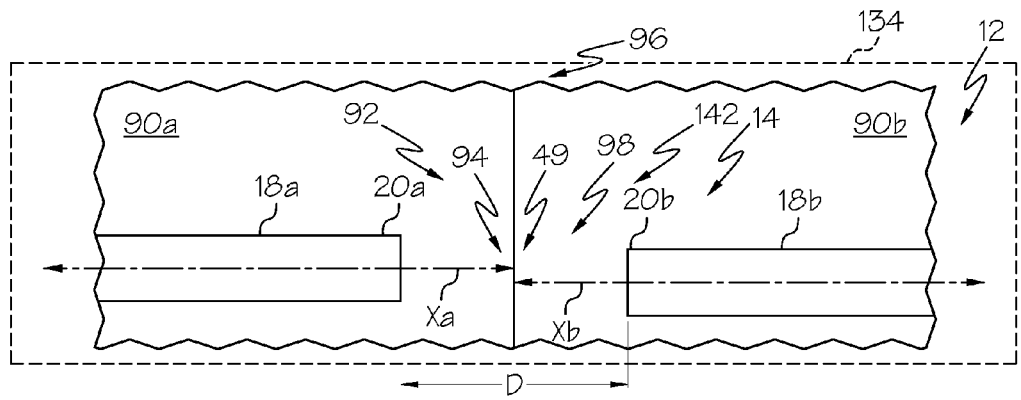
FIG. 2A is a schematic top plan view of one embodiment of the structural components of FIG. 1 nonaligned within a first reference plane.
Figure 2C:
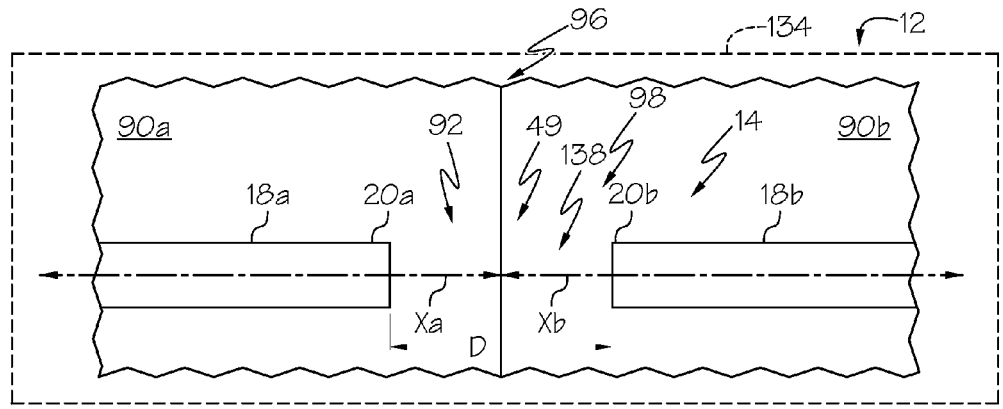
FIG. 2C is a schematic top plan view of another embodiment of the structural components of FIG. 1 aligned within the first reference plane.
Figure 3C:
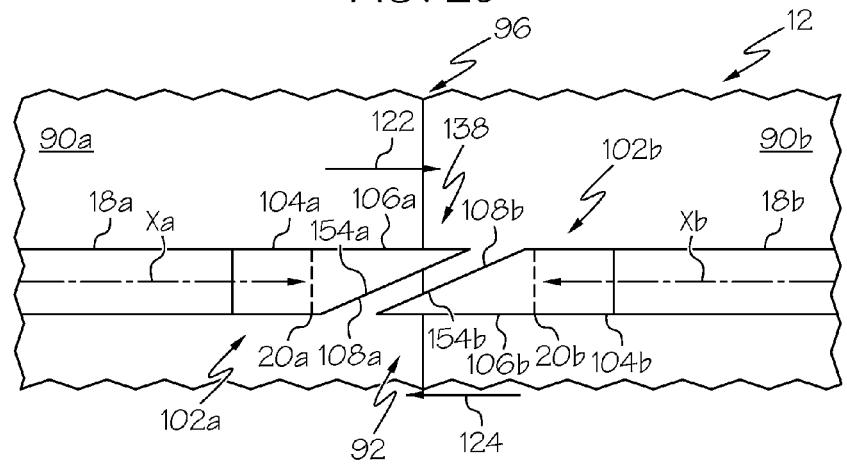
FIG. 3C is a schematic top plan view of another embodiment of the splice brackets of FIG. 1 at a first linear position relative to the structural components of FIG. 2C.
Figure 4C:
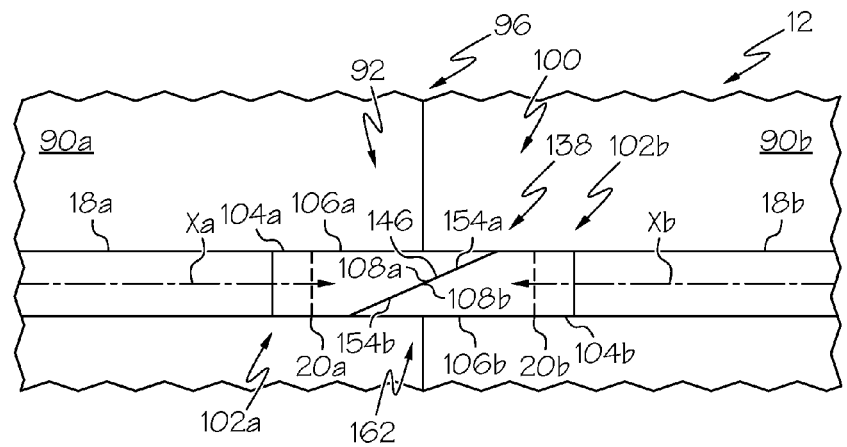
FIG. 4C is a schematic top plan view of the splice brackets of FIG. 3C at a second linear position relative to the structural components of FIG. 2C.

As used herein, and with reference to FIGS. 2A and 2C, the first reference plane 134 is substantially parallel to the skin 90 when the skin 90 is flat or substantially tangential to the skin 90 at the location of the structural component 18 when the skin 90 is curved.

Figure 2D:
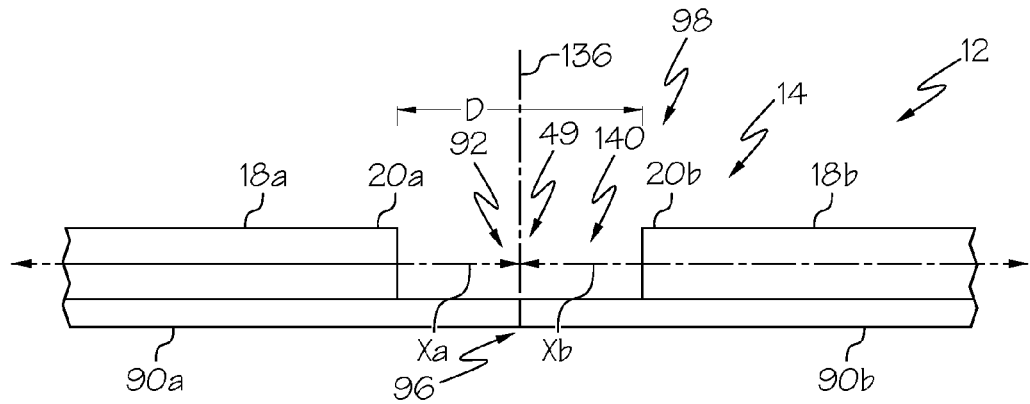
FIG. 2D is a schematic side elevational view of another embodiment of the structural components of FIG. 1 aligned within the second reference plane.
Figure 3D:
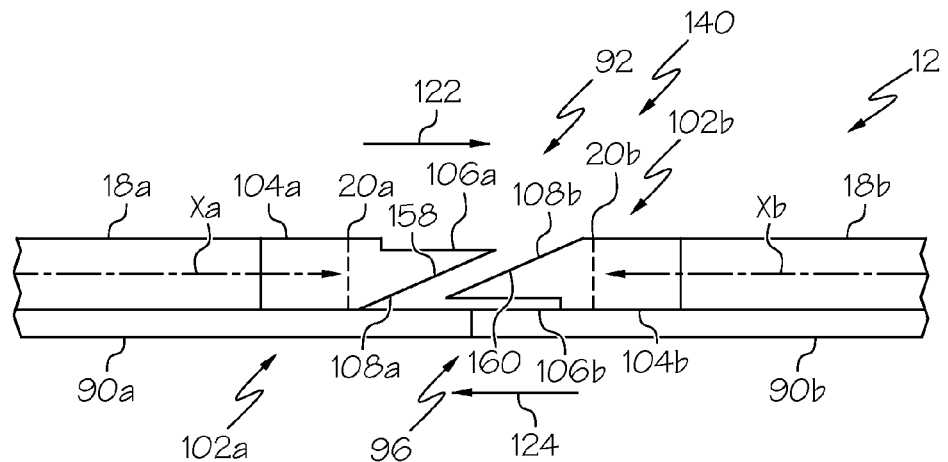
FIG. 3D is a schematic side elevational view of another embodiment of the splice brackets of FIG. 1 at a first linear position relative to the structural components of FIG. 2D.

As used herein, and with reference to FIGS. 2B and 2D the second reference plane 136 is substantially perpendicular to the skin 90 when the skin 90 is flat or substantially perpendicular to the first reference plane 134 (FIGS. 2A and 2C) at the location of the structural component 18 when the skin 90 is curved.

In the example embodiments, non-alignment 142 (FIGS. 2A-4A) within the first reference plane 134 may describe non-alignment of the first structural component 18a (e.g., a first stringer 42a) and the second structural component 18b (e.g., a second stringer 42b) in a hoopwise (e.g., circumferential) direction of the shell structure 12 of the vehicle 10 (e.g., a fuselage 38 of an aircraft 22). In the example embodiments, non-alignment 144 (FIGS. 2B-4B) within the second reference plane 136 may describe non-alignment of the first structural component 18a (e.g., the first stringer 42a) and the second structural component 18b (e.g., the second stringer 42b) in an inboard/outboard direction of the shell structure 12 of the vehicle 10 (e.g., the fuselage 38 of the aircraft 22).

As described herein, the disclosed splice assembly 100 (FIGS. 4A, 4B, 4C and 4D) may interconnect and transfer a load between the first structural component 18a (e.g., the first stringer 42a) and the second structural component 18b (e.g., the second stringer 42b) that are aligned 138 within the first reference plane 134 (FIGS. 2C-4C), aligned 140 within the second reference plane 136 (FIGS. 2D-4D), nonaligned 142 within the first reference plane 134 (FIGS. 2A-4A), nonaligned 144 within the second reference plane 136 (FIG. 2B-4B), or some combination of aligned 138, 140 and/or nonaligned 142, 144 within the first reference plane 134 and/or the second reference plane 136.

Referring to FIGS. 3A, 3B, 3C and 3D, in one example embodiment, the first splice bracket 102a may be connected about the end 20a (e.g., to an end portion) of the first structural component 18a and the second splice bracket 102b may be connected about the end 20b (e.g., to an end portion) of the second structural component 18b.

Each splice bracket 102 may include a connecting member 104 configured to be connected to the structural component 18 proximate (e.g., at or near) the end 20. As one example, the first splice bracket 102a may include the connecting member 104a configured to be connected to the first structural component 18a proximate the end 20a. The second splice bracket 102b may include the connecting member 104b configured to be connected to the second structural component 18b proximate the end 20b. The connecting member 104a of the first splice bracket 102a may be structurally the same as or different from the connecting member 104b of the second splice bracket 102b depending on the configuration (e.g., shape) of the first structural component 18a and the second structural component 18b (e.g., about the ends 20a, 20b), respectively.

Referring to FIGS. 3A, 3B, 3C, 3D, 4A, 4B, 4C and 4D, each splice bracket 102 may include a mating member 106 configured to contact 146 (FIGS. 4A, 4B, 4C and 4D) the mating member 106 of a generally aligned and adjacent splice bracket 102. As one example, the first splice bracket 102a may include the mating member 106a and the second splice bracket 102b may include the mating member 106b. The mating member 106 of each splice bracket 102 may include a linearly sloped mating surface 108 (e.g., the mating surface 108 is disposed at a non-zero angle Θ (FIG. 13) relative to the longitudinal axis X). As one example, the mating member 106a of the first splice bracket 102a may include the mating surface 108a and the mating member 106b of the second splice bracket 102b may include complementary mating surface 108b. In one example construction, the mating surface 108 (e.g., 108a, 108b) may be a substantially flat surface.

Referring still to FIGS. 3A, 3B, 3C, 3D, 4A, 4B, 4C and 4D, the first splice bracket 102a may be moved (e.g., linearly in the direction of directional arrow 122) along the first structural component 18a and/or the second splice bracket 102b may be moved (e.g., linearly in the direction of directional arrow 124) along second structural component 18b in order to contact 146 mating surface 108a and mating surface 108b.

Figure 12:
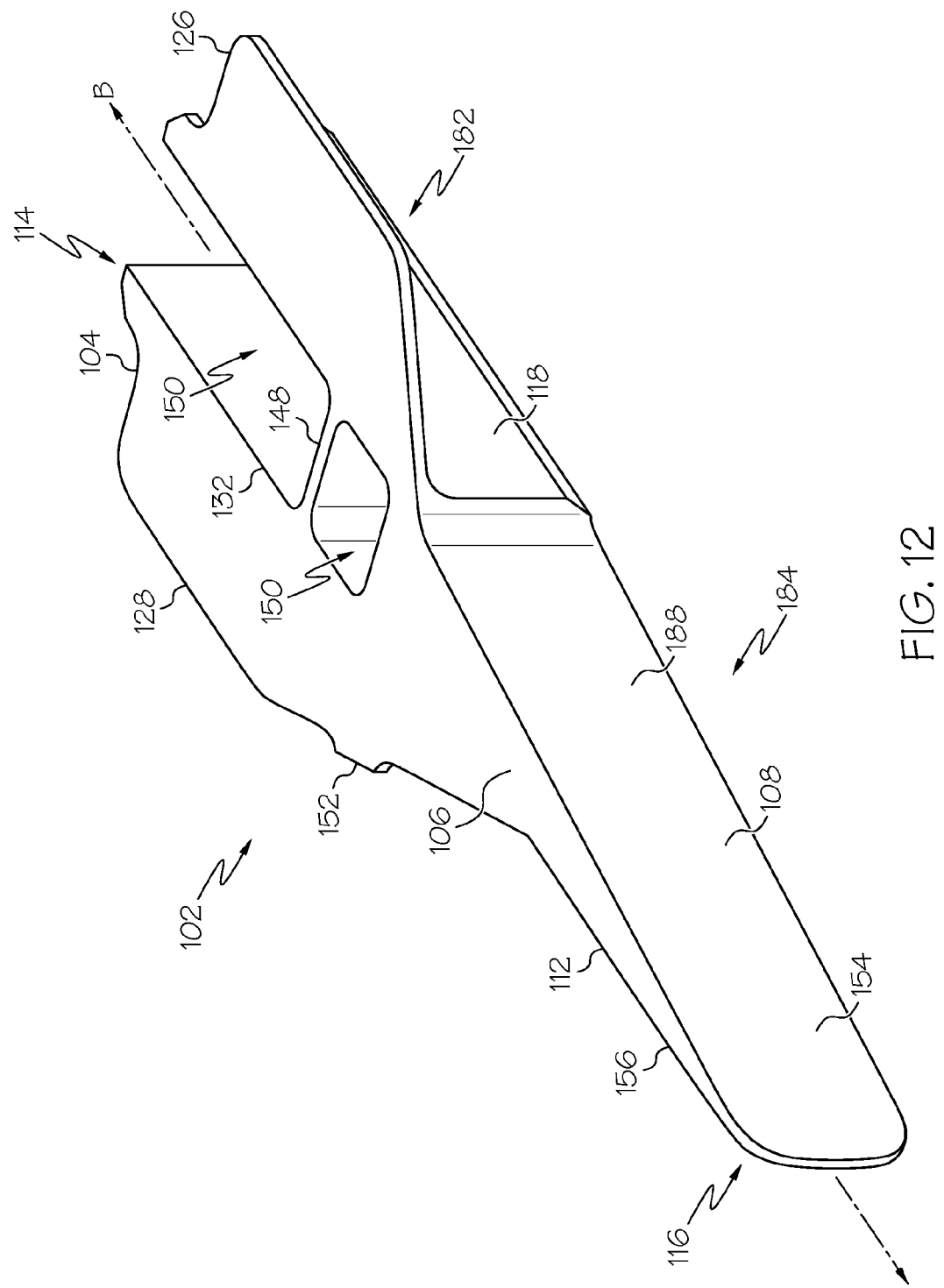
FIG. 12 is a schematic top and side perspective view of one embodiment of the splice bracket of FIG. 1.
Figure 13:
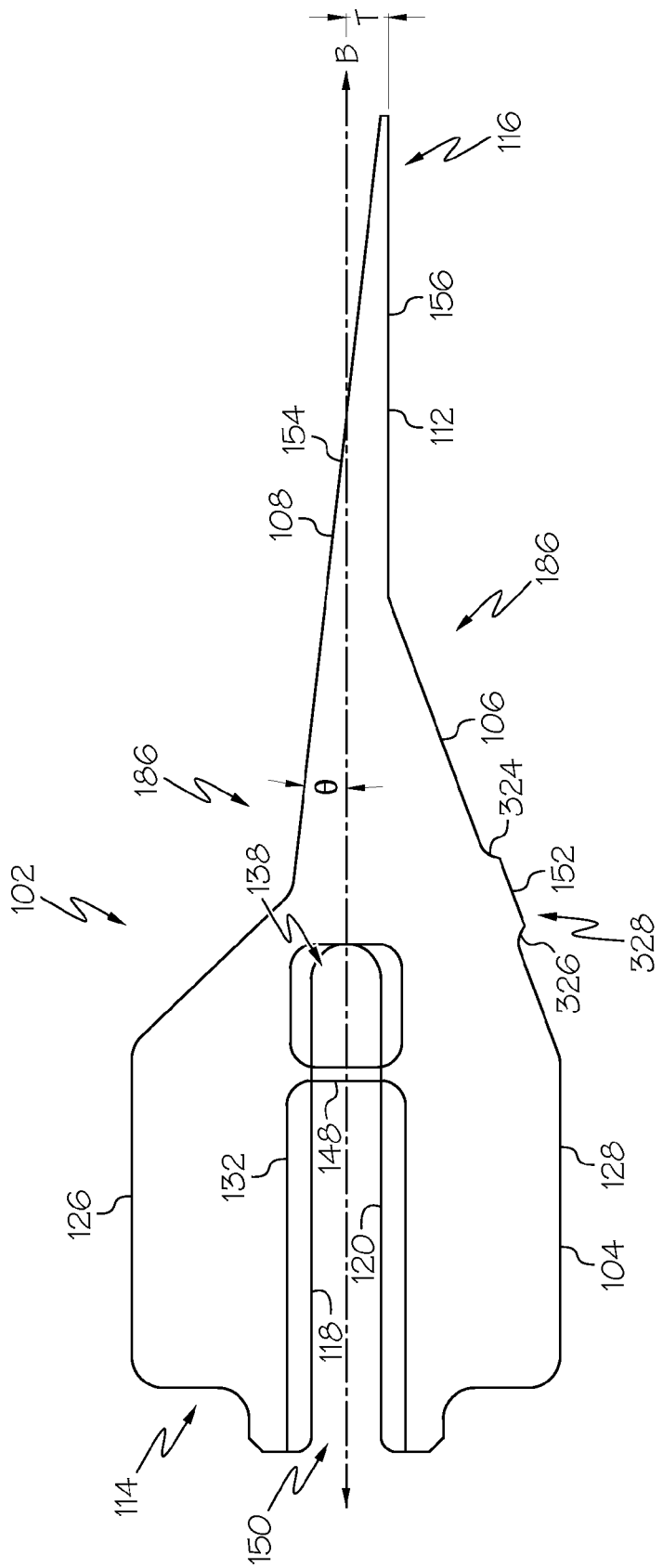
FIG. 13 is a schematic top plan view of the splice bracket of FIG. 12.
Figure 14:
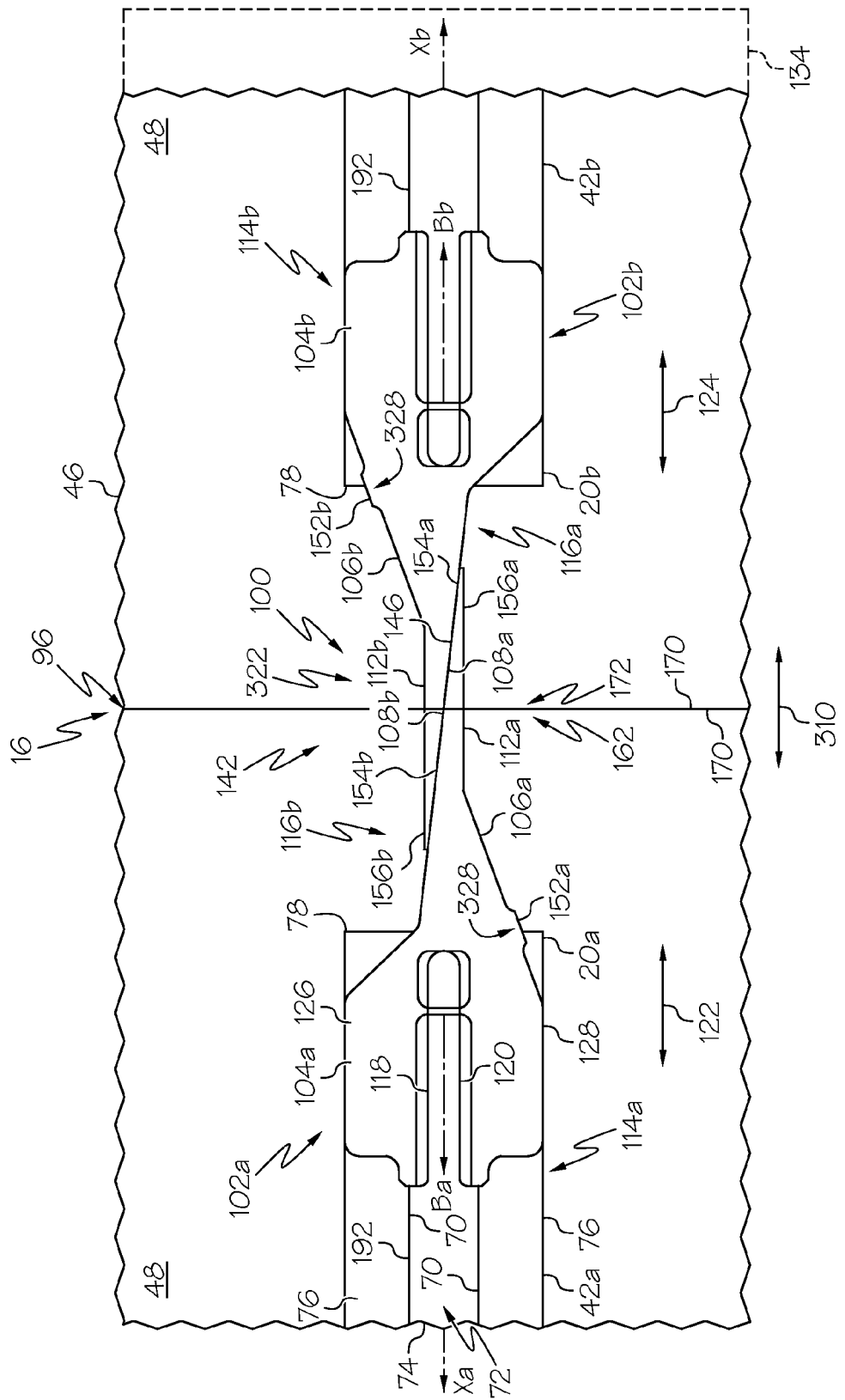
FIG. 14 is a schematic top plan view of another embodiment of the splice assembly of FIG. 1.

As will be discussed in more detail herein below, each splice bracket 102a, 102b may include a positioning feature 152 (FIGS. 12-14). The positioning feature 152 may provide a visual indicator of a desired position of the splice bracket 102a, 102b relative to the structural component 18a, 18b, respectively. As one example, the positioning feature 152 may provide visual indication of the desired position in response to movement (e.g., linearly in the direction of directional arrows 122 and 124) (FIGS. 3A, 3B, 3C and 3D) of the splice bracket 102a, 102b relative to the structural component 18a, 18b, respectively, when contacting 146 mating surfaces 108a, 108b.

Figure 3A:
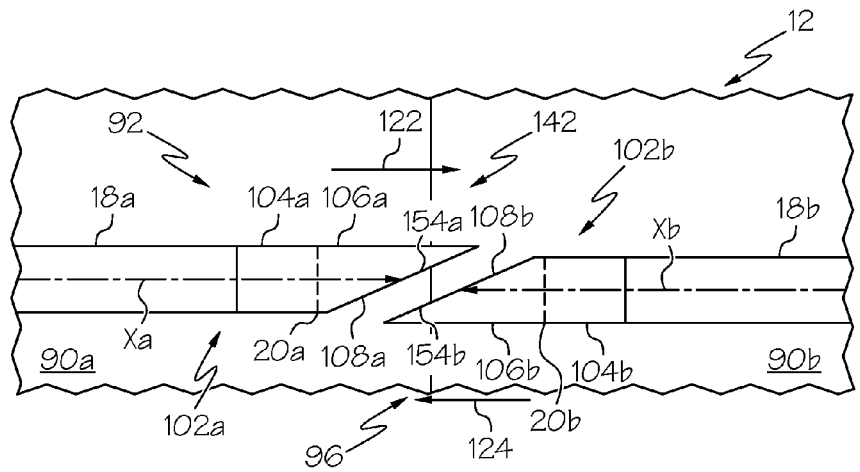
FIG. 3A is a schematic top plan view of one embodiment of the splice brackets of FIG. 1 at a first linear position relative to the structural components of FIG. 2A.
Figure 4A:
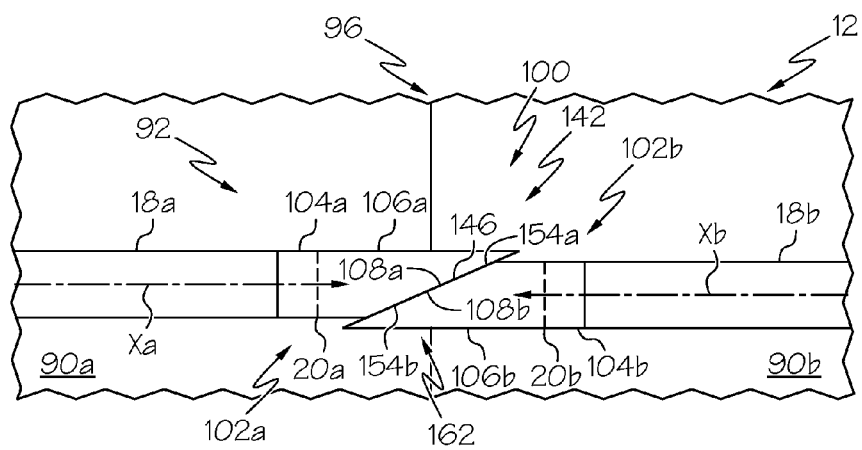
FIG. 4A is a schematic top plan view of the splice brackets of FIG. 3A at a second linear position relative to the structural components of FIG. 2A.

The mating surfaces 108a, 108b of the respective splice brackets 102a, 102b may be configured for joining of structural components 18a, 18b that are one or more of aligned 138 within the reference plane 134 (FIGS. 2C, 3C and 4C), aligned 140 within the reference plane 136 (FIGS. 2D, 3D and 4D), nonaligned 142 within the reference plane 134 (FIGS. 2A, 3A and 4A), and nonaligned 144 within the reference plane 136 (FIGS. 2B, 3B and 4B).

In one example implementation, following positioning (e.g., linear movement in the direction of directional arrows 122 and 124) (FIGS. 3A, 3B, 3C and 3D) of the splice brackets 102a, 102b relative to the structural components 18a, 18b to contact 146 mating surfaces 108a, 108b, as best illustrated in FIGS. 4A, 4B, 4C and 4D, the splice brackets 102a, 102b may be connected together.

Thus, the splice brackets 102 forming the disclosed splice assembly 100 may be used to connect both aligned 138, 140 (FIGS. 4C and 4D) and nonaligned 142, 144 (FIGS. 4A and 4B) structural components 18. Those skilled in the art will appreciate that the splice brackets 102 may find beneficial application for connecting nonaligned 142, 144 structural components 18 by accounting for such nonalignment 142, 144, as best illustrated in FIGS. 4A and 4B.

As one example, and as best illustrated in FIGS. 3A and 4A, the mating surface 108a of the splice bracket 102a may define a linearly sloped (e.g., angled) first side surface 154a of the mating member 106a and the mating surface 108b of the splice bracket 102b may define a linearly sloped (e.g., angled) first side surface 154b complementary and opposite to the first side surface 154a to accommodate for nonalignment 142 within the reference plane 134.

As another example, and as best illustrated in FIGS. 3B and 4B, the mating surface 108a of the splice bracket 102a may define a linearly sloped (e.g., angled) lower surface 158 of the mating member 106a and the mating surface 108b of the splice bracket 102b may define a linearly sloped (e.g., angled) upper surface 160 complementary and opposite to the lower surface 158 to accommodate nonalignment 144 within the reference plane 136.

The mating surface 108a of the first splice bracket 102a may correspond to and complement the mating surface 108b of the second splice bracket 102b. In such a manner, movement (e.g., in the directions of directional arrows 122, 124) of at least one of the first splice bracket 102a relative to the first structural component 18a (e.g., along axis Xa) and/or the second splice bracket 102b relative to the second structural component 18b (e.g., along axis Xb) may contact 146 the mating surfaces 108a, 108b together and provide a fastening location 162 (FIGS. 4A, 4B, 4C and 4D) to join (e.g., splice) the first structural component 18a and the second structural component 18b together.

Referring to FIGS. 4A, 4B, 4C and 4D, upon the mating surface 108a of the first splice bracket 102a and the mating surface 108b of the second splice bracket 102b being in contact 146, the first splice bracket 102a may be connected (e.g., fastened) to the first structural component 18a, the second splice bracket 102b may be connected to the second structural component 18b, and the first splice bracket 102a and the second splice bracket 102b may be connected (e.g., fastened) together to join the first structural component 18a and the second structural component 18b together.

Figure 4D:
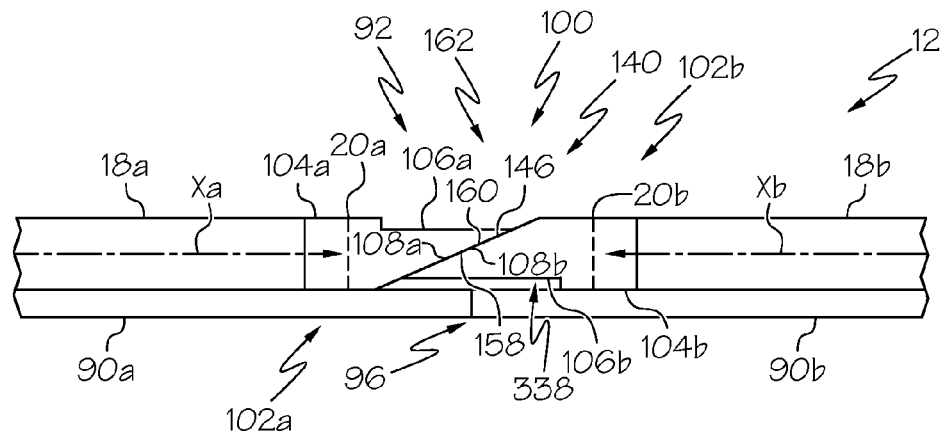
FIG. 4D is a schematic side elevational view of the splice brackets of FIG. 3D at a second linear position relative to the structural components of FIG. 2D.

Referring to FIGS. 4B and 4D, in certain implementations, an open space (e.g., a gap) 338 may exist between one or both of the mating members 106 and the surface of the skin 90 (e.g., between mating member 106b and skin 90b in FIGS. 4B and 4D) when the pair of splice brackets 102a, 102b are positioned to contact 146 mating surfaces 108a, 108b and connected together. Such a gap may be filled, for example, with a shim or other filler material.

Figure 5:
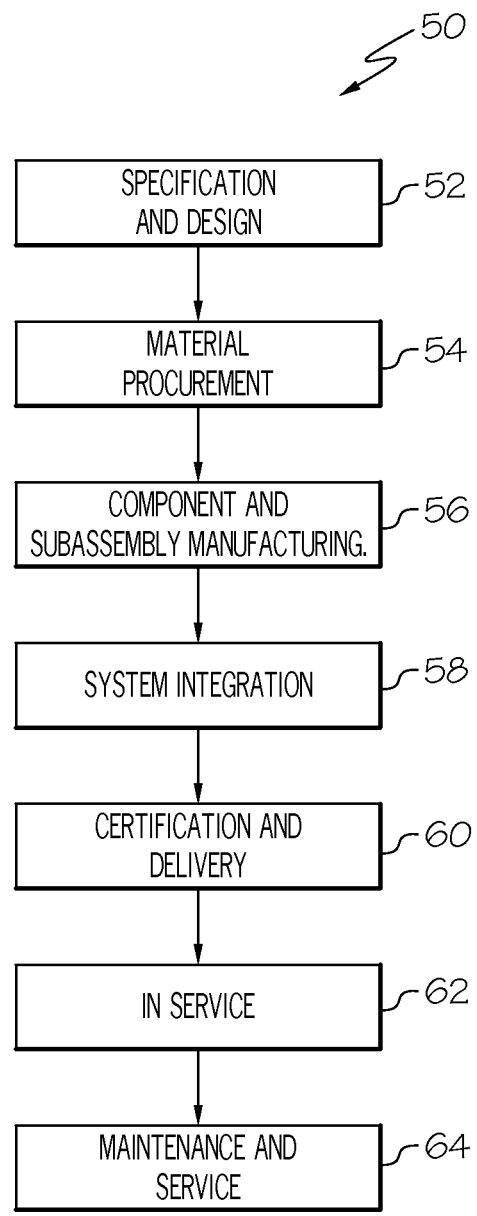
FIG. 5 is a block diagram of aircraft production and service methodology.
Figure 6:
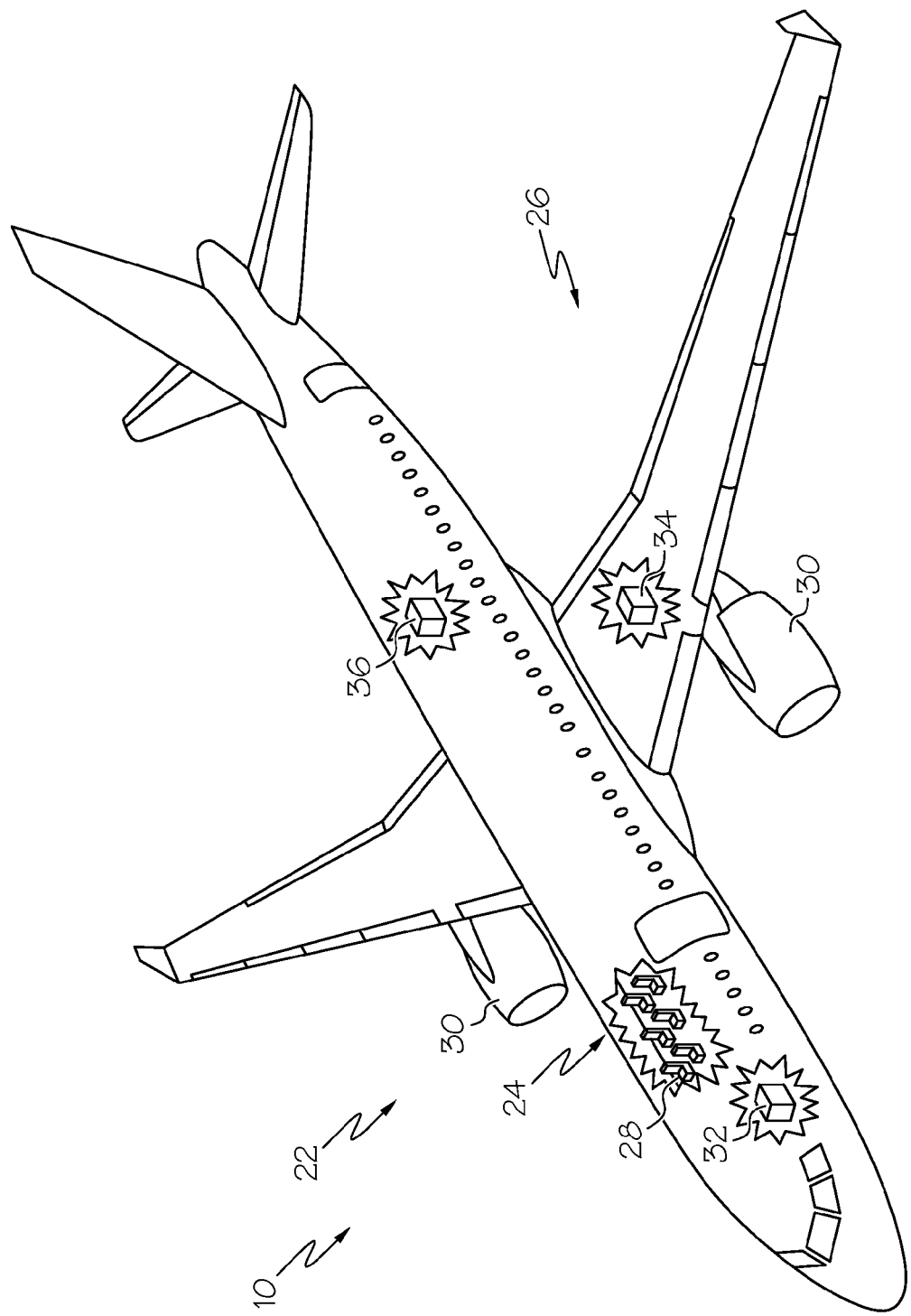
FIG. 6 is a schematic illustration of an aircraft.

Referring to FIGS. 5 and 6, examples of the present disclosure may be described in the context of an aircraft manufacturing and service method 50 as shown in FIG. 5 and an aircraft 22 as shown in FIG. 6. During pre-production, the illustrative method 50 may include specification and design, as shown at block 52, of the aircraft 22 and material procurement, as shown at block 54. During production, component and subassembly manufacturing, as shown at block 56, and system integration, as shown at block 58, of the aircraft 22 may take place. Thereafter, the aircraft 22 may go through certification and delivery, as shown block 60, to be placed in service, as shown at block 62. While in service, the aircraft 22 may be scheduled for routine maintenance and service, as shown at block 64. Routine maintenance and service may include modification, reconfiguration, refurbishment, etc. of one or more systems of the aircraft 22.

Referring to FIG. 5, each of the processes (e.g., blocks 52, 54, 56, 58, 60, 62 and 64) of illustrative method 50 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, the aircraft 22 produced by illustrative method 50 (FIG. 5) may include an airframe 24 (e.g., the shell structure 12 of the vehicle 10) with a plurality of high-level systems 26 and an interior 28. Examples of high-level systems 26 may include, but are not limited to, one or more of a propulsion system 30, electrical system 32, a hydraulic system 34, and/or an environmental system 36. Any number of other systems may be included.

Although an aerospace example is shown, the principles disclosed herein may be applied to other industries, such as the automotive and marine industries. Accordingly, in addition to the aircraft 22, the principles disclosed herein may apply to other types of vehicles 10 (e.g., land vehicles, marine vehicles, space vehicles, etc.) or monocoque structures.

The apparatus (e.g., the splice assembly 100 and/or the splice brackets 102) and methods (e.g., method 200) shown or described herein may be employed during any one or more of the stages of the manufacturing and service method 50. For example, components or subassemblies corresponding to component and subassembly manufacturing (block 56) may be fabricated or manufactured in a manner similar to components or subassemblies produced while aircraft 22 is in service (block 62). Also, one or more examples of the apparatus, method, or combination thereof may be utilized during production stages (blocks 56 and 58), for example, by substantially expediting assembly of the aircraft 22, reducing foreign object debris, reducing component and/or subassembly damage during manufacturing, and/or reducing the cost of the aircraft 22. Similarly, one or more examples of the apparatus or method realizations, or a combination thereof, may be utilized, for example and without limitation, while aircraft 22 is in service, for example, maintenance and service stage (block 64).

Figure 7:
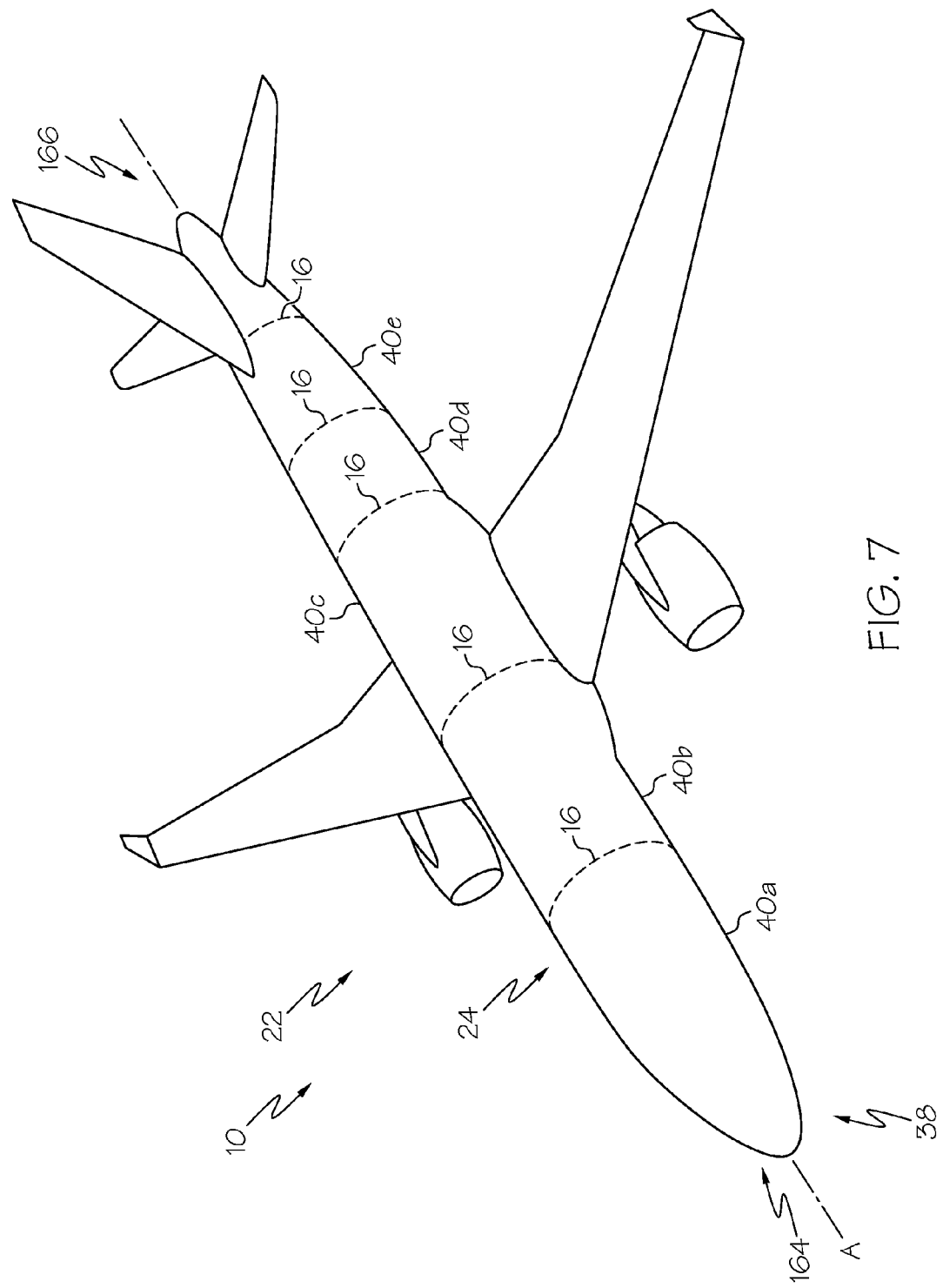
FIG. 7 is another schematic illustration of the aircraft of FIG. 6.

Referring to FIG. 7, in one specific, non-limiting example, the vehicle 10 may be the aircraft 22. The aircraft 22 may include a fuselage 38 having a plurality of fuselage sections 40 (identified individually as fuselage sections 40a-40e). Ends of directly adjacent fuselage sections 40 may be joined together by a plurality of corresponding splice joints 16. Each splice joint 16 may include one or more splice assemblies 100 (FIG. 1).

Figure 8:
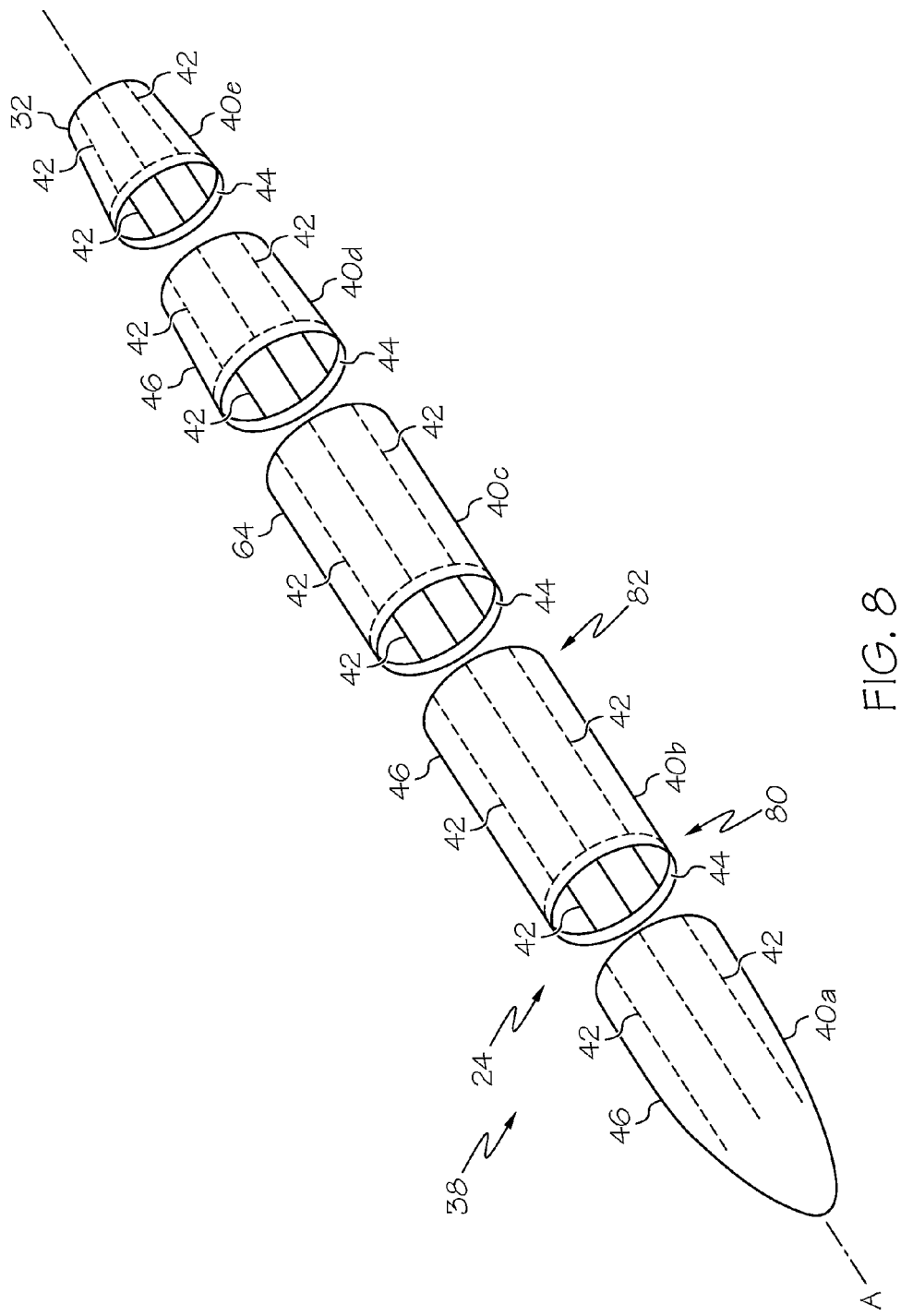
FIG. 8 is a schematic illustration of the fuselage of the aircraft of FIG. 7.

Referring to FIG. 8, the aircraft 22 may include the airframe 24 (e.g., the shell structure 12 including the interconnected plurality of structural components 14 and skin 90) (FIG. 1). As one example, the airframe 24 may include an interconnected plurality of stringers 42 (e.g., longitudinal structural components), plurality of former fuselage frames 44 (e.g., circumferential frames in a hoop-wise direction), and a skin 46. The skin 46 may be connected to the interconnected plurality of stringers 42 and/or plurality of fuselage frames 44 and form the exterior of the airframe 24.

Each fuselage section 40 may include at least one fuselage frame 44 extending circumferential about a longitudinal axis A of the fuselage 38 and a plurality of stringers 42 extending longitudinally from a first (e.g., forward) end 80 to a second (e.g., aft) end 82 of the fuselage section 40. As used herein, the terms "forward" and "aft" are considered relative to a direction of movement of the aircraft 22, for example, the aircraft 22 may include a forward end 164 and an aft end 166 (FIG. 2).

Referring generally to FIGS. 9A, 9B, 10, 11, 14, 15 and 18, in accordance with the example embodiment described above and illustrated in FIG. 1, the first structural component 18a (not shown in FIGS. 9A, 9B, 10, 11, 14, 15 and 18) may include a first stringer 42a, the second structural component 18b (not shown in FIGS. 9A, 9B, 10, 11, 14, 15 and 18) may include a second stringer 42b, and the third structural component 18c (not shown in 9A, 9B, 10, 11, 14, 15 and 18) may include the fuselage frame 44 (FIGS. 10 and 11) positioned between the first stringer 42a and the second stringer 42b at the splice joint 16.

Figure 10:
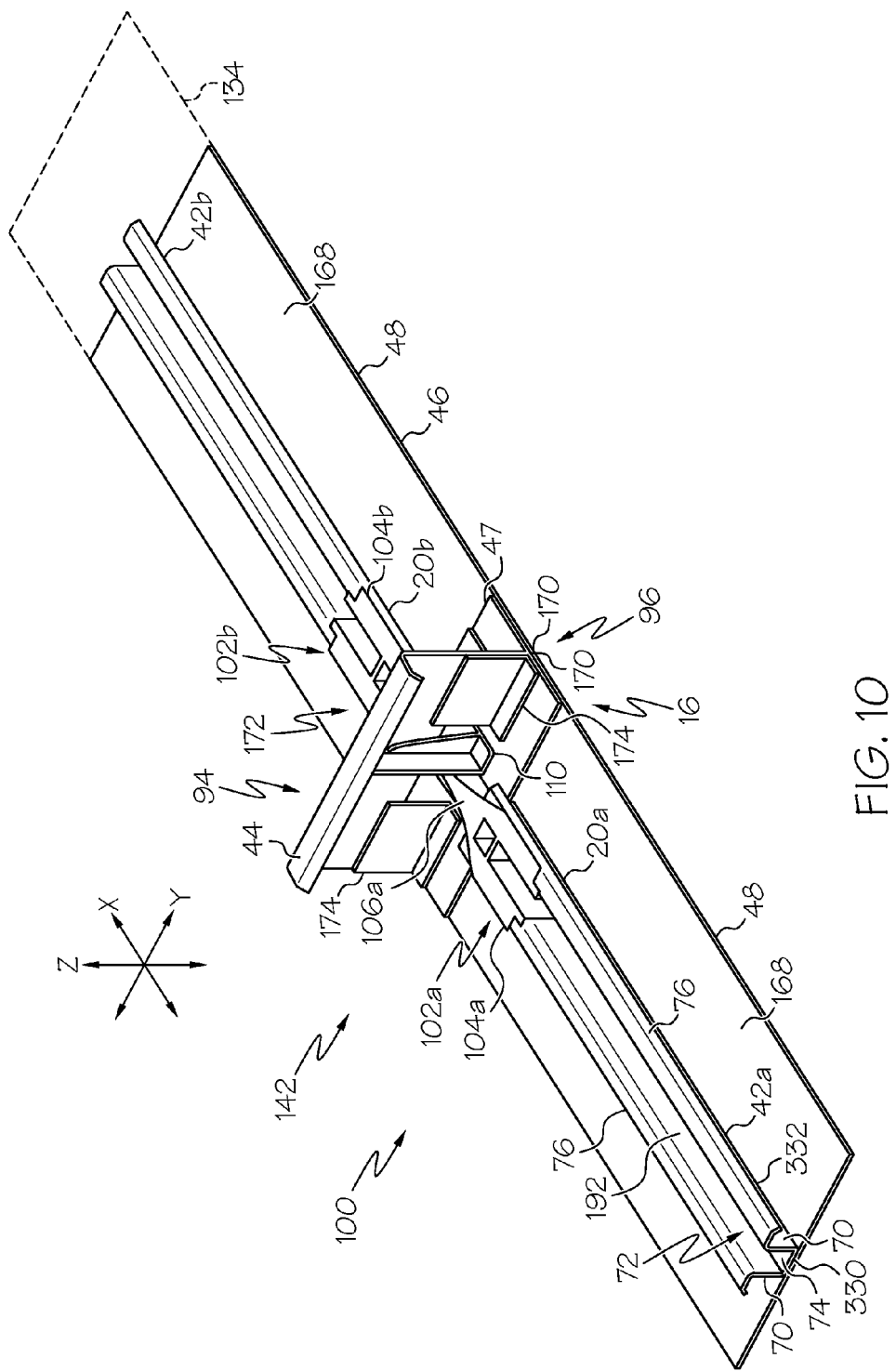
FIG. 10 is a schematic top and side perspective view of another embodiment of the splice assembly of FIG. 1.
Figure 11:
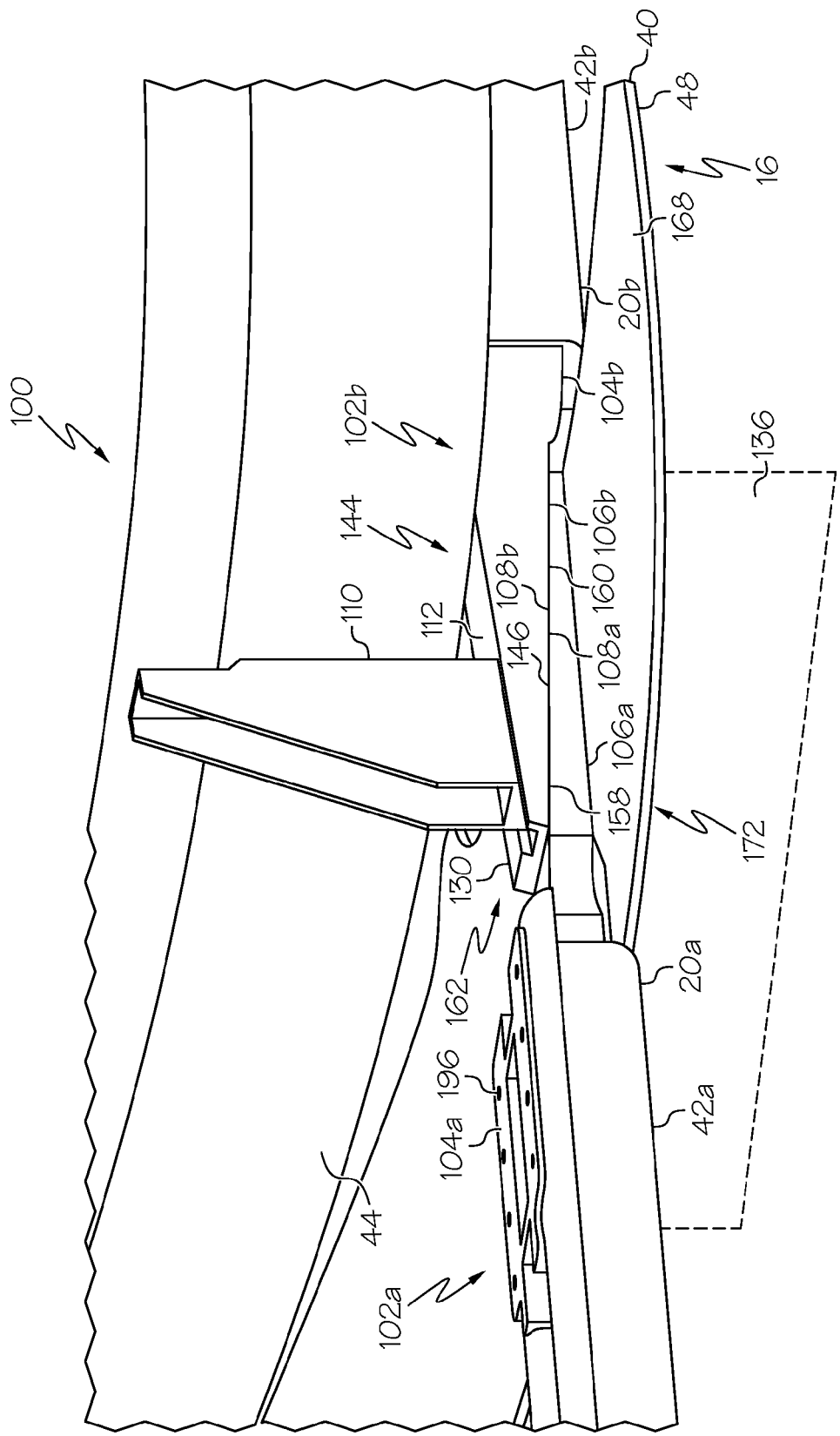
FIG. 11 is a schematic top and side perspective view of another embodiment of the splice assembly of FIG. 1.

Only portion of the fuselage frame 44 is illustrated in FIGS. 10 and 11. Those skilled in the art will appreciated that the fuselage frame 44 may include a continuous frame structure (not specifically shown) running circumferentially along the interior surface 168 of the skin 46 and supporting the splice joint 16 or may be a plurality of fuselage frame sections (not specifically shown) running circumferentially along the interior surface 168 of the skin 46 and supporting the splice joint 16.

As used herein, and with reference to FIGS. 9A, 10, 14, and 18, the first reference plane 134 is substantially parallel to the skin 46 (e.g., skin panels 48) when the skin 46 is flat or substantially tangential to the skin 46 at the location of the stringers 42a, 42b when the skin 46 is curved.

As used herein, and with reference to FIGS. 11 and 15 the second reference plane 136 is substantially perpendicular to the skin 46 (e.g., skin panels 48) when the skin 46 is flat or substantially perpendicular to the first reference plane 134 (FIG. 9A) at the location of the stringers 42a, 42b when the skin 46 is curved (e.g., the second reference plane 136 may be substantially parallel to a plane defined by a fuselage frame 44) (FIG. 11).

Referring to FIGS. 8-10, opposed pairs of adjacent and generally aligned stringers 42 (identified individually as stringer 42a and stringer 42b) of adjacent fuselage sections 40 (e.g., the stringers 42 of fuselage section 40a and the stringers 42 of fuselage section 40b) (FIG. 8) may be connected by the pair of splice brackets 102 (identified individually as splice bracket 102a and splice bracket 102b). The connected pair of splice brackets 102 may be connected to the fuselage frame 44 (FIG. 10) by the splice clip 110.

Each fuselage section 40 may include the skin 46 extending circumferentially around the longitudinal axis A of the fuselage 38. The skin 46 may be connected (e.g., fastened) to the fuselage frames 44 and/or the stringers 42. As one example, the skin 46 may include a plurality of metal and/or composite skin panels 48 (FIGS. 9A, 10, 14, 15 and 18) connected to the fuselage frames 44 and/or the stringers 42.

Figure 9A:
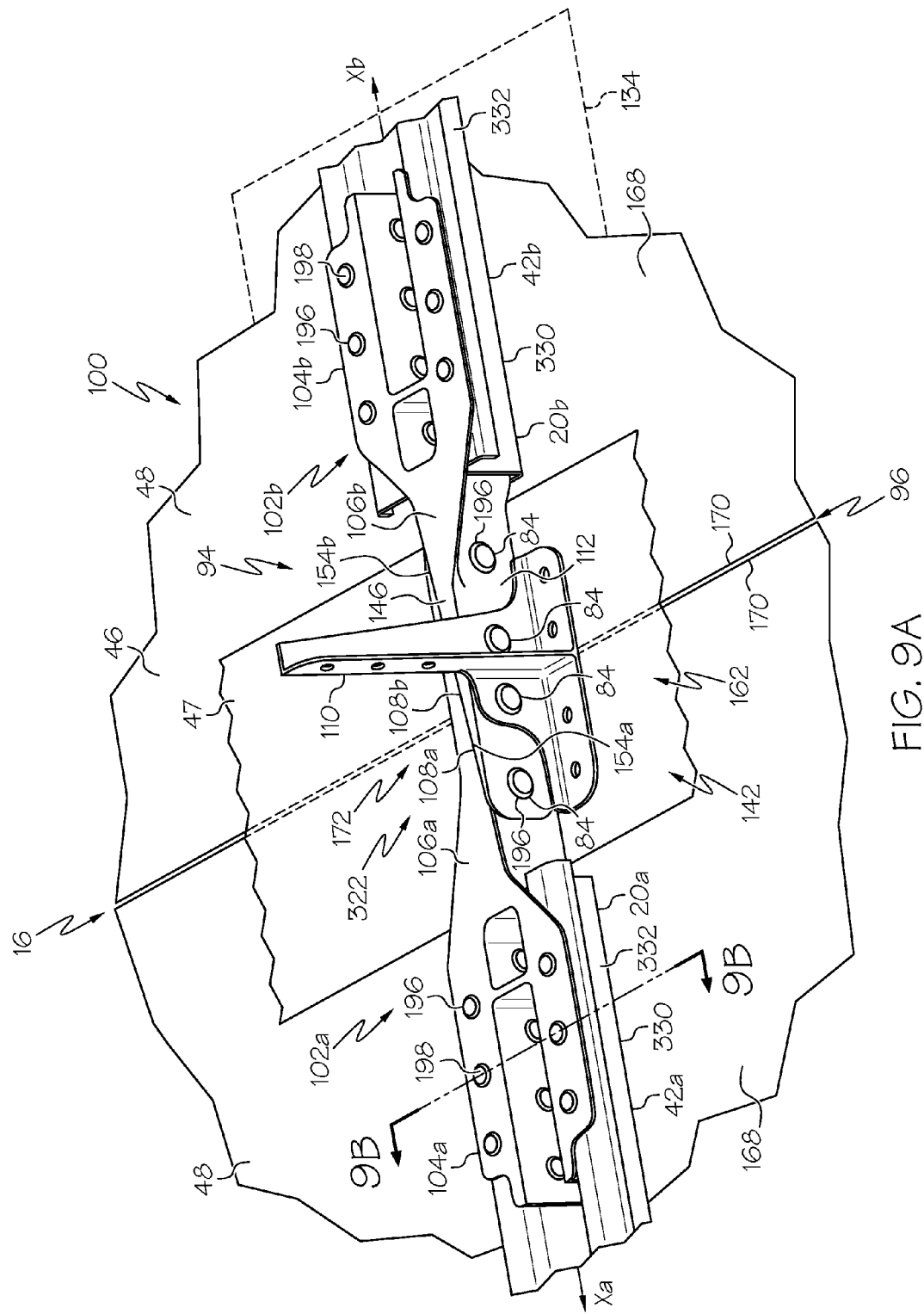
FIG. 9A is a schematic top and side perspective view of one embodiment of the splice assembly of FIG. 1.

Those skilled in the art will recognize that in certain implementations, edges 170 of the skin panels 48 may not be in complete contact (e.g., touching) along an entire length of the splice joint 16 (FIG. 10) when butted up 96 together, for example, as illustrated in FIGS. 9A and 10. Those skilled in the art will also recognize that any gaps defined between butted up 96 skins panels 48 (e.g., between adjacent edges 170) may be filled (e.g., with shims, fillers, etc.) or otherwise dealt with.

Throughout the present disclosure, the term "fuselage section" (also known as a barrel section or fuselage barrel section) (e.g., fuselage sections 40a, 40b, 40c, 40d, 40e) (FIG. 8) is used for convenience to refer to any shell structure 12 (FIG. 1) (e.g., a fuselage-shell structure) extending at least partially (e.g., three hundred sixty degrees)(360°) around an axis having a plurality of structural components 14 (FIG. 1) (e.g., stringers 42 and/or fuselage frames 44)

(FIG. 8) and a skin 90 (FIG. 1) (e.g., skin 46) (FIG. 8). For example, the shell structure 12 may be monocoque structure.

It can be appreciated by one skilled in the art that the fuselage section 40 may not be limited to generally cylindrical structures, but may include structures having circular, elliptical, oval, egg-shaped, rectilinear, tapered, or other cross-sectional shapes. In addition, one skilled in the art can appreciate that the fuselage sections 40 may be one-piece sections in which the skin 46 is a one-piece skin extending continuously for three hundred sixty degrees (360°) around the axis or can be formed from two or more skin panels 48 (e.g., skin segments) joined together to form the full three hundred sixty degree)(360°) fuselage section 40.

Figure 19:
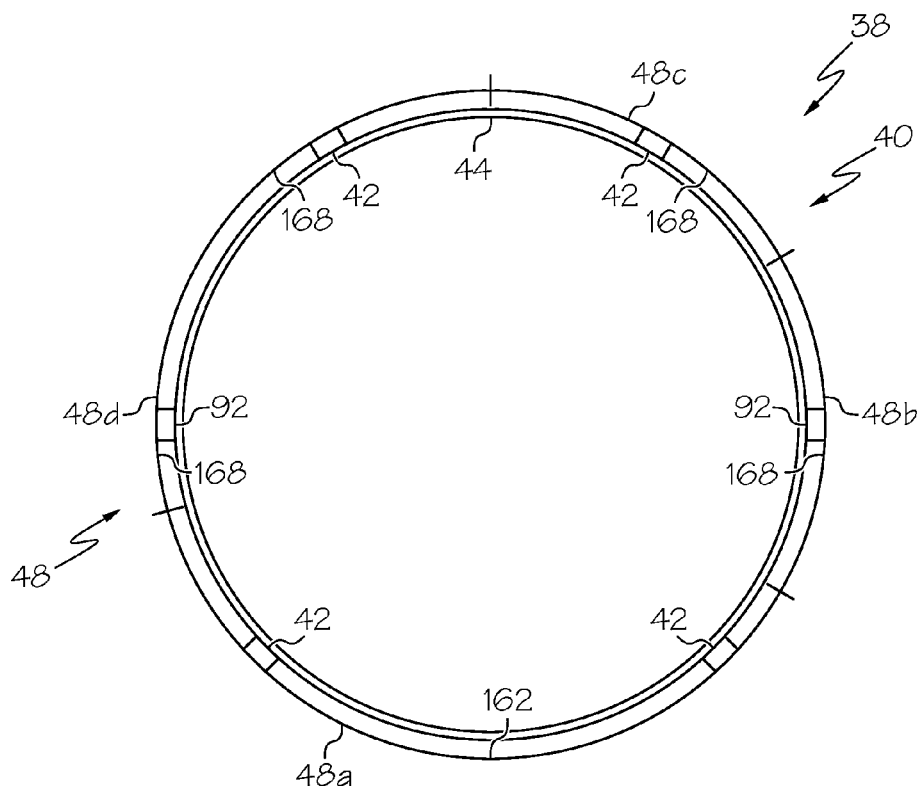
FIG. 19 is a schematic orthogonal end view of the fuselage the aircraft of FIG. 8.

Referring to FIG. 19, in one general, non-limiting example construction, the fuselage 38 and/or the fuselage section 40 may include a circumferentially interconnected plurality of skin panels 48. The plurality of skin panels 48 may, for example, include a keel panel 48a, one or more side panels 48b, one or more crown panels 48c, and/or one or more super panels 48d (e.g., forming a side panel and a crown panel). Each panel 48a, 48b, 48c, 48d may include one or more longitudinal stringers 42 (e.g., connected to an interior surface 168) and/or fuselage frames 44. As one example, the panels 48a, 48b, 48c, 48d may include a crisscrossing support structure of frames 44 and stringers 42 connected to the panels 48a, 48b, 48c, 48d. The panels 48a, 48b, 48c, 48d may be joined together (e.g., circumferentially) to form a fuselage barrel section similar to fuselage sections 40a, 40b, 40c, 40d, 40e, etc.

Figure 20:
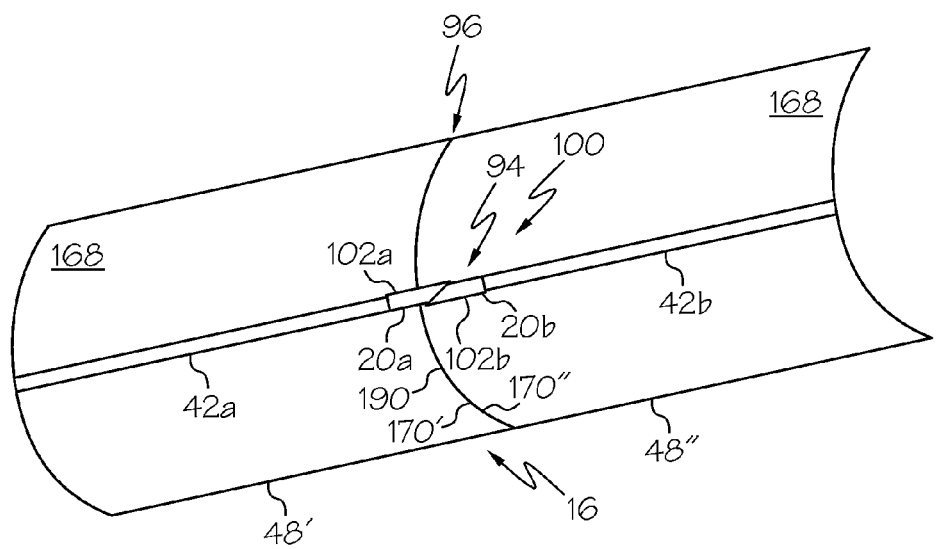
FIG. 20 is a schematic perspective view of a plurality of skin panels longitudinally connected with the splice assembly of FIG. 1.

Referring to FIG. 20, the disclosed splice assembly 100 may also be used to connect two or more longitudinally aligned skin panels 48 (e.g., two or more keel panels 48a, side panels 48b, crown panels 48c, and/or super panels 48d). As one example, edges 170' and 170" of adjacent skin panels 48' and 48" may be butted up 96 (e.g., in contact). This may position the stringers 42a, 42b in the spaced apart 94 relationship since the first stringer 42a may not extend to the edge 170' of the skin panel 48' and the second stringer 42b may not extend to the edge 170" of the skin panel 48". Splice brackets 102a, 102b may be used to interconnect the stringers 42a, 42b and, thus, skin panels 48' and 48" to form the splice joint 16.

Figure 21:
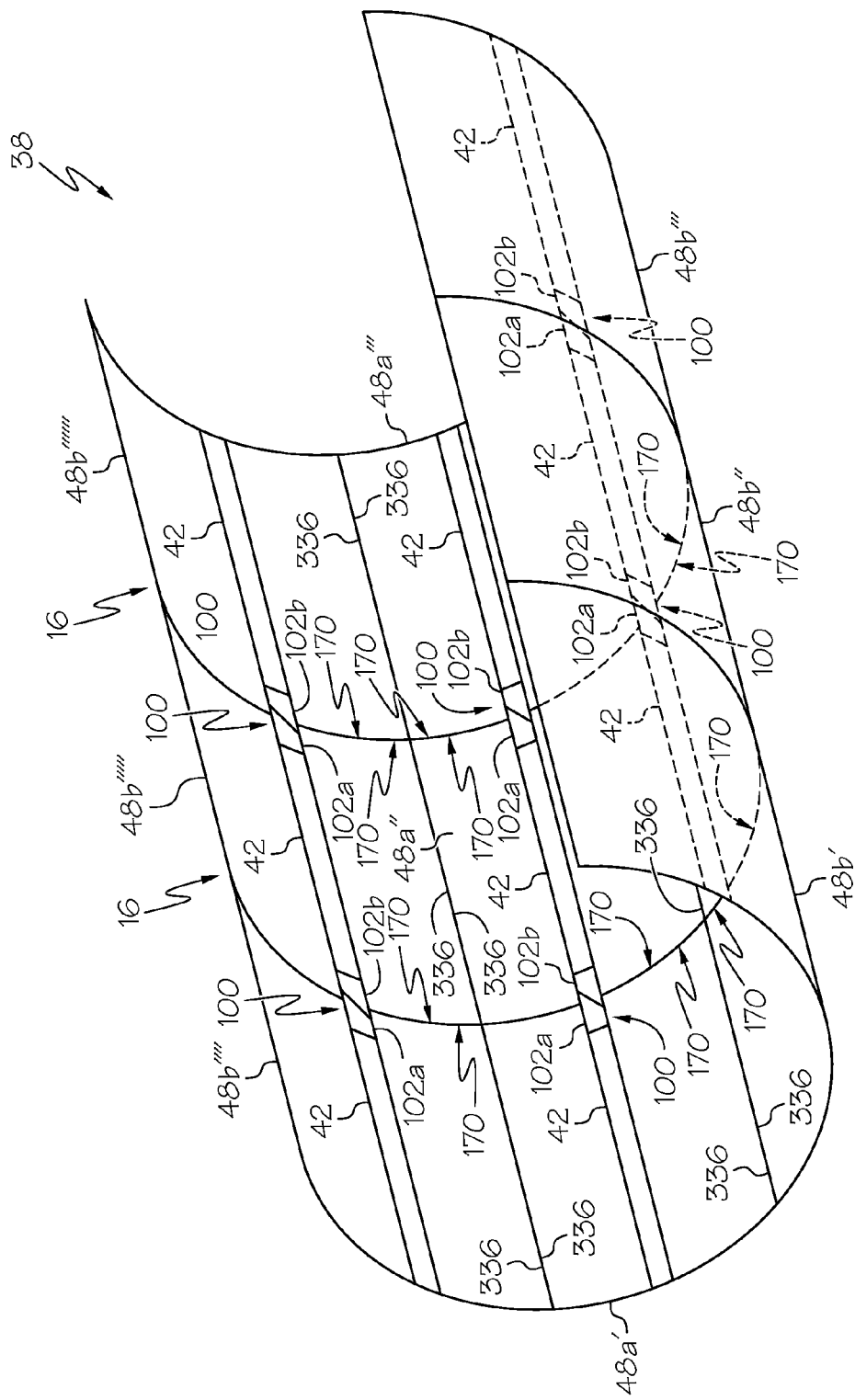
FIG. 21 is a schematic side perspective view of a plurality of skin panels longitudinally connected with a plurality of splice assemblies.

Referring to FIG. 21, in one example implementation, the fuselage 38 (e.g., the fuselage section 40) of the aircraft 22 (FIG. 7) may be formed by a plurality of keel panels 48a', 48a" and 48a''' that are longitudinally joined along edges 170 with a plurality of splice assemblies 100, a first plurality of side panels 48b', 48b" and 48b''' that are longitudinally joined along edges 170 with a plurality of splice assemblies 100, a second plurality of side panels 48b'''', 48b''''' and 48b'''''' that are longitudinally joined along edges 170 with a plurality of splice assemblies 100, and a plurality of crown panels 48c (not shown in FIG. 21) that are longitudinally joined along edges with a plurality of splice assemblies 100. The plurality of keel panels 48a, the plurality of side panels 48b and the plurality of crown panels 48c may then be joined (e.g., circumferentially along edges 336) to form the fuselage section 40 and/or fuselage 38 of the aircraft 22 (FIG. 7).

Those skilled in the art will recognize that only a limited number of stringers 42 (e.g., one) are depicted as connected to the skin panels 48 (e.g., keel panels 48a and side panels 48b) in FIGS. 19-21 for clarity of illustration and that the fuselage frame 44 (FIG. 19) is not shown in FIGS. 20 and 21.

Referring to FIGS. 9A, 9B, 10, 11, 14, 15 and 18, specific, non-limiting example embodiments of the disclosed splice assembly 100 may include the first (e.g., forward) stringer 42a and the second (e.g., aft) stringer 42b. The connecting member 104a of the first splice bracket 102a may be connected (e.g., fastened) to the end of the first stringer 42a and the connecting member 104b of the second splice bracket 102b may be connected to the end of the second stringer 42b. For example, a plurality of mechanical fasteners (e.g., bolts, rivets, etc.) may interconnect the connecting members 104a, 104b of the first splice bracket 102a and the second splice bracket 102b to the first stringer 42a and the second stringer 42b, respectively.

The mating surface 108a of the mating member 106a of the first splice bracket 102a may be aligned and in contact 146 with the mating surface 108b of the mating member 106b of the second splice bracket 102b. The first mating member 106a and the second mating member 106b may be connected (e.g., fastened) together. As one example, a plurality of mechanical fasteners 84 (FIGS. 9A and 9B) (e.g., bolts, rivets, etc.) may interconnect the mating members 106a, 106b of the first splice bracket 102a and the second splice bracket 102b (e.g., at the fastening location 162). As one example, fastening holes 196 (FIG. 9A) may be drilled or machined through the mating members 106a, 106b of the splice brackets 102a, 102b and the splice brackets 102a, 102b may be connected (e.g., fastened) together with fasteners 84.

Figure 18:
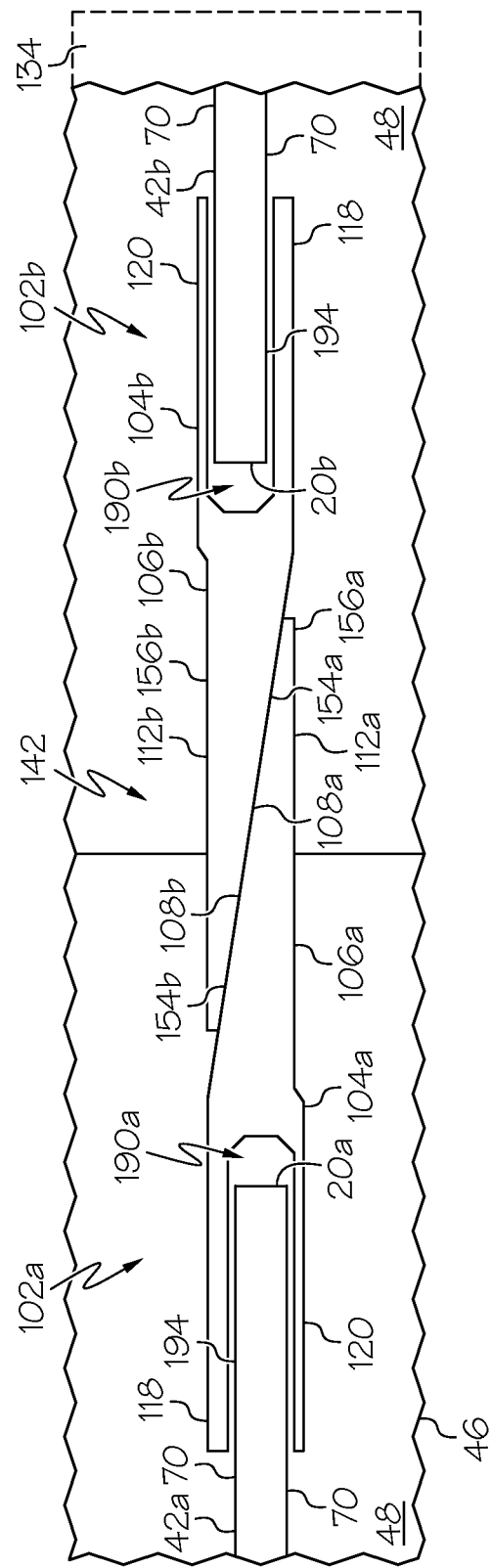
FIG. 18 is a schematic top plan view of another embodiment of the splice assembly of FIG. 1.

In the example embodiments illustrated in FIGS. 9A and 18, the mating surface 108a may define the first (e.g., right) side surface 154a of the mating member 106a of the first splice bracket 102a and the mating surface 108b may define the second (e.g., left) side surface 154b of the mating member 106b of the second splice bracket 102b. Thus, in such an example configuration, the splice brackets 102a, 102b may accommodate (e.g., provide) for nonalignment 142 of the stringers 42a, 42b within the first reference plane 134. As one example, the splice brackets 102a, 102b may accommodate for nonalignment 142 of the stringers 42a, 42b within the first reference plane 134 having a relatively large magnitude of nonalignment (e.g., greater than 0.05 inches). Further, in such an example configuration, the splice brackets 102a, 102b may accommodate for nonalignment 144 of the stringers 42a, 42b within the second reference plane 136 (FIG. 11). As one example, the splice brackets 102a, 102b may accommodate for nonalignment 142 of the stringers 42a, 42b within the first reference plane 134 having a relatively large magnitude of nonalignment (e.g., greater than 0.05 inches) and may accommodate for nonalignment 144 of the stringers 42a, 42b within the second reference plane 136 having a relatively small magnitude of nonalignment (e.g., less than 0.05 inches).

In one specific, non-limiting construction, and as best illustrated in FIGS. 9A, 10, 12-14, and 18, the first splice bracket 102a and the second splice bracket 102b may have the same shape (e.g., the first splice bracket 102a and the second splice bracket 102b may be mirror images of one another).

In the example embodiment illustrated in FIG. 11, the mating surface 108a may define the upper (e.g., top) surface 160 of the mating member 106a of the first splice bracket 102a and the mating surface 108b may define the lower (e.g., bottom) surface 158 of the mating member 106b of the second splice bracket 102b. In the example embodiment illustrated in FIG. 15, the mating surface 108a may define the lower (e.g., bottom) surface 158 of the mating member 106a of the first splice bracket 102a and the mating surface 108b may define the upper (e.g., top) surface 160 of the mating member 106b of the second splice bracket 102b. Thus, in such an example configuration, the splice brackets 102*a*, 102*b* may accommodate for nonalignment 144 of the stringers 42*a*, 42*b* within the second reference plane 136. As one example, the splice brackets 102*a*, 102*b* may accommodate for nonalignment 144 of the stringers 42*a*, 42*b* within the second reference plane 136 having a relatively large magnitude of nonalignment (e.g., greater than 0.05 inches). Further, in such an example configuration, the splice brackets 102*a*, 102*b* may accommodate for nonalignment 142 of the stringers 42*a*, 42*b* within the first reference plane 134 (FIG. 9A). As one example, the splice brackets 102*a*, 102*b* may accommodate for nonalignment 144 of the stringers 42*a*, 42*b* within the second reference plane 136 having a relatively large magnitude of nonalignment (e.g., greater than 0.05 inches) and may accommodate for nonalignment 142 of the stringers 42*a*, 42*b* within the first reference plane 134 having a relatively small magnitude of nonalignment (e.g., less than 0.05 inches).

In another specific, non-limiting construction, and as best illustrated in FIGS. 11 and 15-17, the first splice bracket 102*a* and the second splice bracket 102*b* may have different shapes.

As best illustrated in FIG. 15, in one example, at least one mating member 106 (e.g., the fastening surface 112*b* opposite the mating surface 108*b* of mating member 106*b* of splice bracket 102*b*) may be configured (e.g., shaped) to allow for the open space 338 to be defined between the mating member 106 (e.g., mating member 106*b*) of the splice bracket 102 (e.g., splice bracket 102*b*) and the surface of the skin 46 (e.g., the skin panel 48). The open space 338 may provide clearance between the mating member 106 and the skin 46. As one example, the open space 338 defined between the mating member 106 and the skin 46 may accommodate a non-planar surface extending across the skin panels 48 when butted up 96 along adjacent edges 170, for example, when the stringers 42*a*, 42*b* are nonaligned 144 within the second reference plane 136 (e.g., nonalignment in the inboard/outboard direction). Optionally, the open space 338 may be filled, such as with shims, fillers, etc.

Those skilled in the art will appreciate that while the mating surfaces 108*a*, 108*b* may define generally vertical side surfaces 154*a*, 154*b* of the mating members 106*a*, 106*b* (as in the example embodiments illustrated in FIGS. 9A, 10, 12-14 and 18) or generally horizontal bottom (e.g., lower) surface 158 and/or top (e.g., upper) surface 160 of the mating members 106*a*, 106*b* (as in the example embodiments illustrated in FIGS. 11 and 15-17), other orientations of the mating surfaces 108*a*, 108*b* are also contemplated. As one example (not shown), the mating member 106 of the splice bracket 102 may be rotated about longitudinal axis B (FIG. 13) relative to the connecting member 104 to any orientation, such that mating surface 108 is disposed at a non-zero angle (e.g., 15-degrees, 45-degrees, 40-degrees, 90-degress, etc.) relative to vertical or horizontal (e.g., some angle between vertical and horizontal). Regardless of the angular orientation of the mating members 106*a*, 106*b* of the associated pair of splice brackets 102*a*, 102*b* forming the splice assembly 100, the mating surfaces 108*a*, 108*b* may be complementary in order to be in surface contact 146.

Referring to FIGS. 9A, 10 and 11, the splice bracket 110 may interconnect the splice brackets 102 and stringers 42 to the fuselage frame 44 and/or the skin 46. As one example, the splice clip 110 may be connected (e.g., fastened) to at least one of the first splice bracket 102*a* and/or the second splice bracket 102*b*. As one example, and as best illustrated in FIGS. 9A, 10 and 11, the splice clip 110 may be connected to the mating member 106*b* of the second splice bracket 102*b* and extend outwardly from the skin 46 (e.g., inboard of the fuselage 38) (FIG. 8). As best illustrated in FIGS. 10 and 11, the splice clip 110 may be connected (e.g., fastened) to the fuselage frame 44 to join the connected first splice bracket 102*a* and second splice bracket 102*b* (e.g., the first stringer 42*a* and the second stringer 42*b*) to the fuselage frame 44.

As best illustrated in FIGS. 9A and 10, the splice clip 110 may also be connected to the skin 46 (e.g., adjacent skin panels 48) about the splice joint 16 to further tie-in the skin 46 to the fuselage frame 44 (shown in FIG. 10).

In one example construction, and as best illustrated in FIGS. 10 and 11, the fuselage frame 44 may be spaced away from the skin 46 to define an opening through which a portion of the first splice bracket 102*a* and the second splice bracket 102*b* (e.g., the mating members 106*a*, 106*b*) may pass. The fuselage frame 44 may be connected to the skin 46 by a plurality of shear ties 174 (e.g., shear clips) (FIG. 10). In another example construction (not shown), the shear ties 174 may include one or more openings (also referred to as mouse holes) through which a portion of the first splice bracket 102*a* and the second splice bracket 102*b* (e.g., the mating members 106*a*, 106*b*) may pass. In yet another example construction (not shown), the fuselage frame 44 may include one or more openings (also referred to as mouse holes) through which a portion of the first splice bracket 102*a* and the second splice bracket 102*b* (e.g., the mating members 106*a*, 106*b*) may pass.

Referring to FIGS. 9A and 10, in another example construction, a splice strap 47 may be positioned between the stringers 42 and the skin panels 48 along the splice joint 16 (e.g., along an interface between edges 170 of adjacent skin panels 48). The splice strap 47 may run circumferentially and be connected to the interior surface 168 of the skin 46. The splice strap 47 may act as an internal doubler splicing the skin panels 48 together once butted-up 96.

Figure 22:
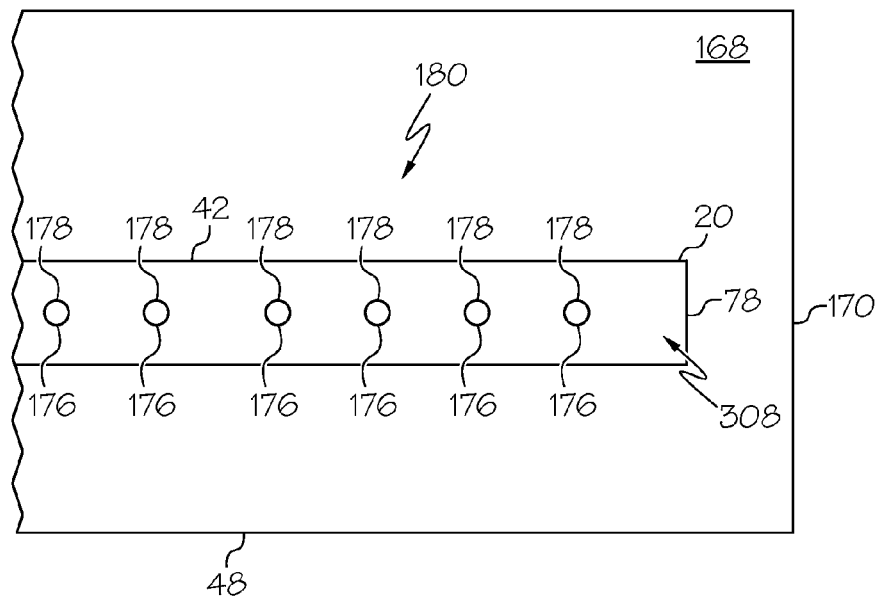
FIG. 22 is a schematic top plan view of the skin panel of FIG. 20.

Those skilled in the art will recognize that the stringers 42 may be connected (e.g., fastened) to the skin panels 48 prior to construction of the splice assembly 100 (e.g., prior to butting-up 96 of adjacent skin panels 48 and splicing the stringers 42 together using the disclosed splice assembly 100). For example, the use of the disclosed splice brackets 102 to account for nonaligned 142, 144 stringers 42 may allow the stringers 42 to be completely connected to the skin panels 48. For example, and as illustrated in FIG. 22, a complete set of fastening holes 176 may be machined in (e.g., through) the skin panel 48 and stringer 42 and mechanical fasteners 178 may be installed from end-to-end 180 of the stringer 42 to interconnect the stringer 42 and the skin panel 48 (e.g., the stringer 42 may be fully fastened to the skin panel 48) prior to construction of the splice assembly 100 (FIGS. 9A, 9B, 10, 11, 15 and 18). Such a construction may be particularly beneficial by decreasing fabrication cycle time, reducing fabrication costs and/or reducing foreign object debris associated with the splice joint 16.

Referring to FIGS. 12-14, in one example embodiment, the splice bracket 102 may include a first end 114 (also referred to as 114*a* and 114*b* with respect to a pair of splice brackets 102*a*, 102*b*) (FIG. 14), a longitudinally opposed second end 116 (also referred to as 114*a* and 114*b* with respect to a pair of splice brackets 102*a*, 102*b*) (FIG. 14), and a longitudinal (e.g., center) axis B. The connecting member 104 may extend from the first end 114 to the mating member 106 defining a first end portion 182 (e.g., a connecting portion) of the splice bracket 102 (FIG. 12). The mating member 106 may extend from the connecting member 104 to the second end 116 defining a second end portion 184 (e.g., a mating portion) of the splice bracket 102 (FIG. 12).

The longitudinal axis B of the splice bracket 102 may be aligned with or be positioned substantially parallel to the longitudinal axis X of the stringer 42. For example, and as best illustrated in FIG. 14 axis Ba of splice bracket 102a may be aligned (e.g., coaxial) with axis Xa of stringer 42a and axis Bb of splice bracket 102b may be aligned (e.g., coaxial) with axis Xb of stringer 42b.

Referring to FIG. 13, the mating surface 108 of the mating member 106 may be disposed at a non-zero angle Θ relative to the longitudinal axis B. As one example, angle Θ may be approximately between 1-degee and 89-degrees. As another example, angle Θ may be approximately between 1-degee and 45-degrees. As another example, angle Θ may be approximately between 3-degees and 15-degrees. As another example, angle Θ may be approximately between 3-degees and 10-degrees. As yet another example, angle Θ may be approximately 5-degees.

Referring to FIGS. 12-17, in one example embodiment, mating member 106 may include a fastening surface 112 opposite the mating surface 108. The fastening surface 112 may be disposed substantially parallel to the longitudinal axis B (FIG. 13) of the splice bracket 102.

Referring to FIG. 13, the mating surface 108 may extend from proximate 186 the connecting member 104 to the second end 116 and the fastening surface 112 may extend from proximate 186 the connecting member 104 to the second end 116. Due to the mating surface 108 being disposed at the angle Θ, the thickness T of the mating member 106 may decrease as it approaches the second end 116 of the splice bracket 102. Therefore, the mating member 106 may taper from the connecting member 104 to the second end 116 of the splice bracket 102.

Referring to FIGS. 9A and 11, in one example construction, the splice clip 110 may be connected (e.g., fastened) to the fastening surface 112 of the splice bracket 102.

Referring to FIGS. 12-14, in one embodiment, the mating surface 108 may define the first side surface 154 of the mating member 106. The fastening surface 112 may define an opposing second side surface 156 of the mating member 106. As one specific, non-limiting example, and as best illustrated in FIG. 14, the mating surface 108a may define the first side surface 154a of the mating member 106a and the fastening surface 112a may define an opposing second side surface 156a of the mating member 106a. The mating surface 108b may define the first side surface 154b of the mating member 106b and the fastening surface 112b may define an opposing second side surface 156b of the mating member 106b.

Referring to FIGS. 15-17, in one embodiment, the mating surface 108 may define one of the upper surface 160 or the lower surface 158 of the mating member 106. The fastening surface 112 may define the opposing upper surface 160 or the lower surface 158 of the mating member 106. As one specific, non-limiting example, and as best illustrated in FIG. 15, the mating surface 108a may define the lower surface 158a of the mating member 106a and the fastening surface 112a may define the opposing upper surface 160a of the mating member 106a. The mating surface 108b may define the upper surface 160b of the mating member 106b and the fastening surface 112b may define the lower surface 158b of the mating member 106b.

Accordingly, when the pair of splice brackets 102 (e.g., the first splice bracket 102a and the second splice bracket 102b) are positioned at ends 20a, 20b of respective aligned 138, 140 (FIGS. 2C-4C and 2D-4D) stringers 42a, 42b, the mating surface 108a of the first splice bracket 102a and the mating surface 108b of the second splice bracket 102b may oppose one another and contact 146 one another to define the fastening location 162 (FIGS. 9A, 11, 14, 15 and 18) and connect the stringers 42a, 42b.

Similarly, when the pair of splice brackets 102 (e.g., the first splice bracket 102a and the second splice bracket 102b) are positioned at ends 20a, 20b of respective nonaligned 142 stringers 42a, 42b (FIGS. 2A-4A, 9, 10, 14 and 18) or nonaligned 144 stringers 42a, 42b (FIGS. 2B-4B, 11 and 15), the mating surface 108a of the first splice bracket 102a and the mating surface 108b of the second splice bracket 102b may oppose one another and contact 146 one another to account for nonalignment 142, 144 of the stringers 42a, 42b within at least one of the reference plane 134 (FIGS. 2A, 9, 10, 14 and 18) and/or the reference plane 136 (FIGS. 2B, 11 and 15), define the fastening location 162, and connect the stringers 42a, 42b.

Figure 23:
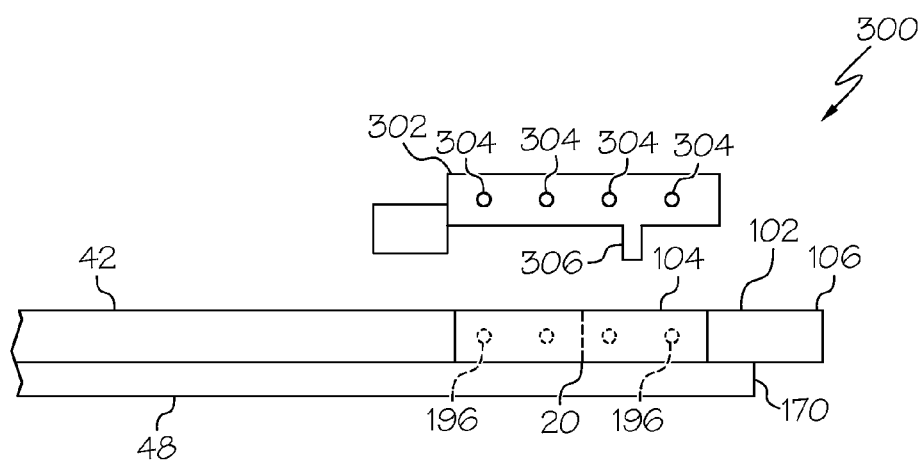
FIG. 23 is a schematic side elevational view of one embodiment of a tooling fixture.

FIGS. 16 and 17 illustrate the pair of splice brackets 102 (e.g., the first splice bracket 102a and the second splice bracket 102b) with the plurality of fastening holes 196. In one example implementation, the fastening holes 196 (e.g., in the connecting members 104a, 104b and/or the mating member s106a, 106b) may be located and machined (e.g., drilled) upon the splice brackets 102a, 102b being positioned relative to associated stringers 42a, 42b (FIGS. 9A, 10, 11, 14, 15, 18 and 23) and the mating surfaces 108a, 108b being placed in contact 146, for example, utilizing a tooling fixture 300 (FIG. 23). In another example implementation, the fastening holes 196 may be pre-drilled in both the first splice bracket 102a and the second splice bracket 102b (e.g., in the connecting members 104a, 104b and/or the mating members 106a, 106b) and the fastening holes 196 may be aligned. In another example implementation, the fastening holes 196 may be pre-drilled in one splice bracket 102 (e.g., in the connecting member 104a and/or the mating member 106a of the first splice bracket 102a) and the fastening holes 196 in the other splice bracket 102 (e.g., in the connecting member 104b and/or the mating members 106b of the second splice bracket 102b) may be match drilled upon positioning the splice brackets 102a, 102b relative to the associated stringers 42a, 42b and contacting 146 the mating surfaces 108a, 108b. In yet another example implementation, a combination of pre-drilled fastening holes 196 and located and drilled fastening holes 196 may be utilized.

In the example implementation illustrated in FIGS. 9A, 10, 14 and 18, the stringers 42a, 42b may be nonaligned 142 within the reference plane 134 and the splice brackets 102a, 102b may accommodate for such nonalignment 142. In the example implementation illustrated in FIGS. 11 and 15, the stringers 42a, 42b may be nonaligned 144 within the reference plane 136 and the splice brackets 102a, 102b may accommodate for such nonalignment 142.

Referring to FIG. 14, translation (e.g., linearly in the direction of directional arrows 122 and 124) of at least one of the first splice bracket 102a and/or the second splice bracket 102b may account for different magnitudes of nonalignment 142 within the reference plane 134. For example, the greater the magnitude of nonalignment, the farther at least one of the first splice bracket 102a and/or the second splice bracket 102b may be moved (e.g., linearly in the direction of directional arrows 122 and 124) toward one another.

Referring to FIG. 15, translation (e.g., linearly in the direction of directional arrows 122 and 124) of at least one of the first splice bracket 102a and/or the second splice bracket 102b may account for different magnitudes of nonalignment 144 within the reference plane 136. For example, the greater the magnitude of nonalignment, the farther at least one of the first splice bracket 102a and/or the second splice bracket 102b may be moved (e.g., linearly in the direction of directional arrows 122 and 124) toward one another.

Thus, the splice brackets 102 of the disclosed splice assembly 100 may account for different magnitudes of nonalignment. As one example, nonalignment 142 within the reference plane 134 having an approximately zero magnitude of nonalignment may equate to alignment 138 of the stringers 42a, 42b within the reference plane 134. As another example, nonalignment 144 within the reference plane 136 having an approximately zero magnitude of nonalignment may equate to alignment 140 of the stringers 42a, 42b within the reference plane 136. As another example, nonalignment 142 within the reference plane 134 having a magnitude of nonalignment of up to approximately 0.05 inches may equate to a relatively small magnitude of nonalignment of the stringers 42a, 42b within the reference plane 134. As another example, nonalignment 144 within the reference plane 136 having a magnitude of nonalignment of up to approximately 0.05 inches may equate to a relatively small magnitude of nonalignment of the stringers 42a, 42b within the reference plane 136. As another example, nonalignment 142 within the reference plane 134 having a magnitude of nonalignment of between approximately 0.05 inches and 0.15 inches may equate to a relatively large magnitude of nonalignment of the stringers 42a, 42b within the reference plane 134. As another example, nonalignment 144 within the reference plane 136 having a magnitude of nonalignment of between approximately 0.05 inches and 0.15 inches may equate to a relatively large magnitude of nonalignment of the stringers 42a, 42b within the reference plane 136.

Those skilled in the art will appreciate that the magnitude of nonalignment (e.g., nonalignment 142 and/or nonalignment 144) within reference plane 134 and/or reference plane 136, respectively, that may be accounted for with the splice brackets 102 of the splice assembly 100 may depend on the angle Θ (FIG. 13) of the mating surface 108 relative to the longitudinal axis B. For example, the larger the angle Θ, the larger the relative magnitude of nonalignment that may be accommodated. As one example, magnitudes of nonalignment approaching 0.25 inches are contemplated by increasing angle Θ (FIG. 13) of the mating surface 108 relative to the longitudinal axis B. Thus, in one example implementation, splice brackets 102 having a range of different angles Θ may be provided in order to optimize splicing the stringers 42 based on the relative magnitude of nonalignment. For example, an assembler of the disclosed splice assembly 100 may select from a plurality of splice brackets 102 having a range of different angles Θ (e.g., select two complementary splice brackets 102) in order to optimize splicing.

Referring to FIGS. 12, 14, 15 and 17, in one example construction, the mating surface 108 of the mating member 106 may include a surface area 188 (FIGS. 12 and 17). The surface area 188 of the mating surface 108 of at least one of the splice brackets 102 forming the splice assembly 100 may be sufficiently large to also accommodate for nonalignment 142, 144 within reference planes 134, 136 (FIGS. 14 and 15). As one non-limiting example, and as best illustrated in FIGS. 12 and 14, movement (e.g., linearly in the direction of directional arrows 122 and 124) of at least one of the first splice bracket 102a and/or the second splice bracket 102b may account for a relatively large magnitude of nonalignment within reference plane 134. The surface area 188 of the first side surface 154 (154a and/or 154b in FIG. 14) of the mating surface 108 (108a and/or 108b in FIG. 14) of at least one splice bracket 102 (102a and/or 102b in FIG. 14) may be sufficiently large to accommodate for a relatively small magnitude of nonalignment within reference plane 136 (FIG. 15). As another non-limiting example, and as best illustrated in FIGS. 15 and 17, movement (e.g., linearly in the direction of directional arrows 122 and 124) of at least one of the first splice bracket 102a and/or the second splice bracket 102b may account for a relatively large magnitude of nonalignment within reference plane 136. The surface area 188 of the surface (lower surface 158 and/or upper surface 160 in FIG. 15) of the mating surface 108 (108a and/or 108b in FIG. 15) of at least one splice bracket 102 (102a and/or 102b in FIG. 15) may be sufficiently large to accommodate for a relatively small magnitude of nonalignment within reference plane 134 (FIG. 14). Thus, in one example implementation, splice brackets 102 having a range of different surface areas 188 may be provided in order to accommodate different magnitudes of nonalignment. For example, an assembler of the disclosed splice assembly 100 may select from a plurality of splice brackets 102 having a range of different surface areas 188 (e.g., select two splice brackets 102) in order to accommodate a relatively large magnitude of non-alignment and/or a relatively small magnitude of non-alignment.

Referring to FIGS. 9A, 9B, 10, 11, 14, 15 and 18, generally each splice bracket 102 (e.g., splice brackets 102a and 102b) may be configured (e.g., suitably shaped and sized) to be connected to an associated end 20 (e.g., end 20a and end 20b) of the stringer 42 (e.g., stringer 42a, and stringer 42b). In one example construction, the connecting member 104 may be suitably shaped and/or sized to coincide and cooperate with the shape and/or size of the end 20 of the stringer 42.

As a general example, the stringer 42 may define an elongated stiffening member connected to the skin 46 (e.g., skin panel 48). The stringer 42 may include a foot 330, a web 332, and a flange 76 (FIGS. 9A and 9B) integrated into a unitary structure. The foot 330 may be connected (e.g., fastened) to the skin 46 (e.g., by fasteners 178) (FIG. 9B). The web 332 may extend from the foot 330 to stiffen the stringer 42. The stringer 42 may have various cross-sectional shapes (e.g., defined by the foot 330, the web 332 and the flange 76).

FIGS. 9A, 9B, 10, 11, 14, 15, 18 and 22, in one example, the fastening holes 176 formed in the stringer 42 and/or the fastening holes 196 formed in the splice bracket 102 (e.g., the connecting member 104) and the stringer 42 may be countersunk (e.g., in a "V" type of countersink) (FIG. 9B) to allow installation of flush head fasteners (e.g., fasteners 178 and/or fasteners 198). While the fasteners 178 and fasteners 198 are illustrated in FIG. 9B as bolts/clearance fit bolts, those skilled in the art will recognize that the fasteners 178 and/or fasteners 198 may be interference fit fasteners. Therefore, the fastening holes 176 and/or fastening holes 196 may be drilled without threads and the shank of the fastener 178 and/or fastener 196 may be contact with walls of the fastening hole 176 and/or fastening hole 196, respectively, along its entire length. Additionally, the fasteners 178 and/or fasteners 198 need not be hex head fasteners (e.g., bolts), but the nut may be hex head. As interference fit fasteners, there is no need to hold the fasteners 178 and/or fasteners 198 while the nut is tightened.

As one specific, non-limiting example, and as best illustrated in FIGS. 9A, 9B, 10, 11, 14 and 15, the stringer 42 may have a generally "U" cross-sectional shape (also referred to as a hat stringer—the cross section of the stringer 42 resembles a man's hat) and the connecting member 104 may have a cross-sectional shape suitable to mate with (e.g., fit within) the "U"-shaped end 20 of the stringer 42. Thus, the connecting member 104 (104a, 104b) of the splice bracket 102 (e.g., brackets 102a, 102b) may mate with an interior portion 192 (FIGS. 9A, 9B and 14) of the end 20 (e.g., ends 20a, 20b) of the stringer 42 (e.g., stringers 42a, 42b).

As another specific, non-limiting example (not shown), the stringer 42 may have a generally inverted "U" cross-sectional shape and the connecting member 104 may have a shape suitable to mate with the inverted "U"-shaped end 20 of the stringer 42. As another specific, non-limiting example (not shown), the stringer 42 may have a generally "Z" cross-sectional shape and the connecting member 104 may have a shape suitable to mate with the "Z"-shaped end 20 of the stringer 42. As another specific, non-limiting example (not shown), the stringer 42 may have a generally "I" cross-sectional shape and the connecting member 104 may have a shape suitable to mate with the "I"-shaped end 20 of the stringer 42. As another specific, non-limiting example (not shown), the stringer 42 may have a generally inverted "T" cross-sectional shape and the connecting member 104 may have a shape suitable to mate with the inverted "T"-shaped end 20 of the stringer 42. As another specific, non-limiting example (not shown), the stinger 42 may have a generally circular cross-sectional shape and the connecting member 104 may have a shape suitable to fit at least partially around or at least partially within the circular-shaped end 20 of the stringer 42.

As another specific, non-limiting example, and as best illustrated in FIG. 18, the stringer 42 (e.g., stringers 42a, 42b) may have e.g., the "Z", "I", inverted "U", inverted "T", etc. cross-sectional shape and the connecting member 104 (e.g., connecting members 104a, 104b) may form a sleeve 190 (e.g., sleeves 190a, 190b) having a size and shape suitable to partially receive the stringer 42 (e.g., the end 20 of the stringer 42). Thus, the connecting member 104 (e.g., connecting members 104a, 104b) of the splice bracket 102 (e.g., splice brackets 102a, 102b) may wrap around and mate with (e.g., be in surface contact with) at least a portion of (e.g., an exterior portion 194) of the end 20 (e.g., ends 20a, 20b) of the stringer 42 (e.g., stringers 42a, 42b).

Other alternative shapes and/or configurations of the stringer 42 and/or the connecting member 104 of the splice bracket 102 are also contemplated that mate with an exterior portion 194 and/or the interior portion 192 of the stringer 42 (e.g., the end 20 of the stringer 42).

Referring to FIGS. 9A, 9B, 10, 11, 14 and 15, in one particular, non-limiting example, the stringers 42 may be hat stringers (e.g., "U" cross-sectional-shaped stringers). As one example, and as best illustrated in FIGS. 10 and 14, the hat stringer 42 may include a pair of spaced apart and laterally opposed sidewalls 70. The sidewalls 70 may define the web 332 of the stringer 42. Each sidewall 70 may include the flange 76 extending generally perpendicularly outward from and upper end. The hat stringer 42 may include a bottom surface 74 extending between lower ends of the sidewalls 70. The bottom surface 74 may define the foot 330 of the stringer 42. The bottom surface 74 may contact and be connected (e.g., fastened) to the skin panel 48. The sidewalls 70 and bottom surface 74 (e.g., the foot 330 and the web 332) may define a generally "U"-shaped channel 72 (FIGS. 9A, 9B, 10 and 14).

Referring to FIGS. 9B, 12, 13, 14, 16 and 17, in one particular, non-limiting example, the connecting member 104 of the splice bracket 102 may be configured to be connected (e.g., fastened) to the end 20 of the hat stringer 42. As one example, the connecting member 104 may be connected to the web 332 and the flanges 76 forming the hat stringer 42. In one example construction, the connecting member 104 may include a pair of spaced apart and laterally opposed sidewalls 118 and 120. The sidewalls 118, 120 may fit between and contact laterally opposed sidewalls 70 (e.g., the web 332) of the hat stringer 42 (e.g., the interior portion 192 of the stringer 42) such that at least a portion of the sidewalls 118, 120 is located within the channel 72.

As best illustrated in FIGS. 9B, 13 and 14, lower ends of the sidewall 118, 120 may not be structurally connected, such that no portion of the connecting member 104 is in contact with the foot 330 (e.g., the bottom surface 74) (FIG. 14) of the stringer 42 (FIGS. 9B and 14). Thus, the splice bracket 102 may not be mechanically connected to the bottom surface 74 (e.g., the foot 330) of the stringer 42, which may beneficially lead to a reduction or elimination of the need for shimming (e.g., between the stringer 42 and the splice bracket 102). Further, eliminating the structural connection between the lower ends of the sidewall 118, 120 and eliminating contact between the connecting member 104 and the foot 330 (e.g., the bottom surface 74) of the stringer 42 may allow for unobstructed movement (e.g., linearly in the direction of directional arrows 122 and 124) (FIG. 14) of the splice bracket 102 relative to the stringer 42 (e.g., the fasteners 178 (FIG. 9B) connecting the foot 330 of the stringer 42 and the skin 46 (e.g., skin panel 48) may not obstruct movement of the splice bracket 102).

The connecting member 104 may include opposing wings 126, 128 extending generally perpendicularly outward from upper ends of the sidewall 118, 120. As one example, a first wing 126 may extend laterally outward from an upper end of a first sidewall 118 and a second wing 128 may extend laterally outward from an upper end of a second sidewall 120. The wings 126, 128 may contact and be supported by at least a portion of the opposed flanges 76 of the stringer 42 (e.g., an exterior portion 194 of the stringer 42).

Referring to FIG. 18, in one specific, non-limiting embodiment of the splice bracket 102, the connecting member 104 may be configured to be connected (e.g., fastened) to the end 20 of the "Z", "I", "T" etc. cross-sectional shaped stringer 42. In one example construction, the connecting member 104 may include the pair of spaced apart and laterally opposed sidewalls 118 and 120 defining the sleeve 190. The sidewalls 118, 120 may fit over and contact the web 332 and, optionally, the flange 76, of the stringer 42 (e.g., the exterior portion 194 of the stringer 42) such that at least a portion of the sidewalls 70 is located within the sleeve 190.

Accordingly, in any shape and/or configuration of the stringer 42, the connecting member 104 of the splice bracket 102 may be shaped and/or configured to interface with (e.g., come into surface contact with and be connected to) the web 332 and flange 76 of the stringer 42. For example, the connecting member 104 of the splice bracket 102 may be configured to come into surface contact with and be connected (e.g., fastened) to only the web 332 (e.g., sidewalls 70) and the flange 76 of the stringer 42 and not the foot 330 (e.g., the bottom surface 74) of the stringer 42 (e.g., that is connected to the skin 46).

During construction of the splice assembly 100, once the splice bracket 102 has been suitably positioned relative to the associated stringer 42 (e.g., to account for stringer nonalignment), fastening holes 196 (FIGS. 9A, 11 and 15-17) may be machined through the sidewalls 118, 120 of the connecting member 104 and the sidewalls 70 of the stringer 42. Fastening holes 196 may also be machined through the wings 126, 128 of the connecting member 104 and the flanges 76 of the stringer 42. The connecting member 104 may be fastened to the stringer 42 via mechanical fasteners 198 (e.g., bolts, rivets, etc.) (FIGS. 9A and 9B) installed in the machined fastening holes 196.

Referring to FIGS. 12, 13, 14, 16, 17 and 23, the splice bracket 102 may include at least one indexing feature 132 (FIGS. 12, 13, 16 and 17). The indexing feature 132 may be configured to be engaged by the tooling fixture 300 (FIG. 23), which may secure (e.g., clamp) the splice bracket 102 to the stringer 42 once in a selected position, for example, to account for nonalignment 142, 144 of the stringers 42 within at least one of the reference plane 134 and/or the reference plane 136. The tooling fixture 300 may include a clamp body 302 and a plurality of position-locating holes 304 disposed through the clamp body 302.

The clamp body 302 may be configured to clamp around the stringer 42 and the splice bracket 102 to fix the position of the splice bracket 102 relative to the end 20 of the stringer 42. As one example construction, the clamp body 302 may clamp at least a portion of the sidewalls 70 and/or the flanges 76 (FIG. 14) of the stringer 42 and at least a portion of the sidewalls 118, 120 and/or the wings 126, 128 (FIG. 14) of the connecting member 104 of the splice bracket 102.

Once the clamp body 302 is secured to the stringer 42 and the splice bracket 102, the position-locating holes 304 may be used for coordinating and locating the plurality of fastening holes 196 that are to be machined through the connecting member 104 of the splice bracket 102 and the stringer 42. Thus, the tooling fixture 300 is a drilling template (e.g., utilizing the position-locating holes 304 disposed through the clamp body 302) to match drill the fastening holes 196 through the splice bracket 102 (e.g., the connecting member 104) and the stringer 42 (e.g., the web 332 and/or the flange 76).

Referring to FIGS. 12, 13, 16, 17 and 22, in one example construction, the indexing feature 132 may include a cross member 148 extending between opposed upper edges of the sidewalls 118, 120 of the connecting member 104. The cross member 148 may form at least two index openings 150 in the connecting member 104. In another example construction, and as best illustrated in FIG. 16, the indexing feature 132 may include a single index opening 150 defined between the opposed sidewalls 118, 120 of the connecting member 104. The tooling fixture 300 may include an indexing arm 306 (FIG. 23) configured to mate with the indexing feature 132 of the splice bracket 102. As one example construction, the indexing arm 306 may extend outwardly from the clamp body 302 and be received within the index opening 150 and contact the cross member 148 or another surface defining the opening 150.

In one example implementation, the indexing feature 132 may enable the tooling fixture 300 to be repeatably placed in substantially the same position relative to the splice bracket 102 and the stringer 42 on each different splice bracket 102-to-stringer 42 connection. Accordingly, the position of the fastening holes 196 machined through the sidewalls 118, 120 of the connecting member 104 and the sidewalls 70 of the stringer 42 and the fastening holes 196 machined through the wings 126, 128 of the connecting member 104 and the flanges 76 of the stringer 42 relative to the stringer 42 and the splice bracket 102 may be repeatably located.

Those skilled in the art will appreciate that the shape and/or configuration of the tooling fixture 300 may depend upon the shape and/or configuration of the stringer 42 and/or the connection member 104 of the splice bracket 102.

Referring to FIG. 16, in one example embodiment, the mating member 106 of the splice bracket 102 may include a pair of laterally opposed lips 130 extending generally perpendicularly outward from opposed longitudinal edges of the fastening surface 112. The lips 130 may form a guide for connection of the splice clip 110 (FIG. 11) when connected to the fastening surface 112 of the splice bracket 102. As one example, and as best illustrated in FIGS. 11 and 16, the opposed lips 130 may extend generally perpendicularly outward from the fastening surface 112 (e.g., defining the upper surface 160) of the mating member 106 of the splice bracket 102 in closest proximity to the fuselage frame 44 (e.g., the second splice bracket 102b in FIG. 11).

Referring to FIGS. 12-14, the splice bracket 102 may also include the positioning feature 152. In one example construction, the positioning feature 152 may include a tab extending outwardly from an upper perimeter of the splice bracket 102. The positioning feature 152 may include a forward edge 324 and a rear edge 326. The area between the forward edge 324 and the rear edge 326 may define positioning boundary 328. The positioning feature 152 may be located approximately between an interface of the connecting member 104 and the mating member 106. The positioning feature 152 provides a visual marker for positioning the splice bracket 102 relative to the end 20 of the stringer 42.

As one example, and with reference to FIG. 14, during positioning (e.g., moving or sliding) of the splice bracket 102 (e.g., linearly in the direction of arrows 122, 124) relative to the end 20 of the stringer 42, an edge 78 of the end 20 of the stringer 42 may be positioned (e.g., located) within a physical positioning boundary 328 defined by the positioning feature 152. The size of the positioning feature 152 (e.g., the distance between the forward edge 324 and the read edge 326) may depend upon the length of the connecting member 104 and/or the length of the mating member 106. Thus, the positioning feature 152 may visually define the maximum translation (e.g., linearly in the direction of direction arrows 122, 124) available to the splice bracket 102 relative to the stringer 42 (e.g., to the end 20 of the stringer 42) for proper positioning.

Referring to FIG. 22, an edge margin 308 (also referred to as edge distance "ED") may be needed between the edge 78 of the end 20 of the stringer 42 and the location of the fastening hole 176 (and fastener 178) closest to the end 20 of the stringer 42. As such, locating the edge 78 (FIG. 14) of the end 20 of the stringer 42 within the boundary defined by the positioning feature 152 (FIGS. 12-14) may set a proper the edge margin 308. As one example, a minimum edge margin 308 may be at least two times a diameter of the fastener 178 (e.g., two times the diameter of the fastener 178 plus ⅟₁₆ inch measured from a center of the fastening hole 176 to the edge 78).

Referring to FIG. 14, once the splice brackets 102a, 102b have been connected, the connected pair of splice brackets 102a, 102b may be moved (e.g., linearly in the direction of directional arrow 310) in order to equalize the positioning features 152a, 152b relative to the position of the ends 20a, 20b of the stringer 42a, 42b.

Figure 24:
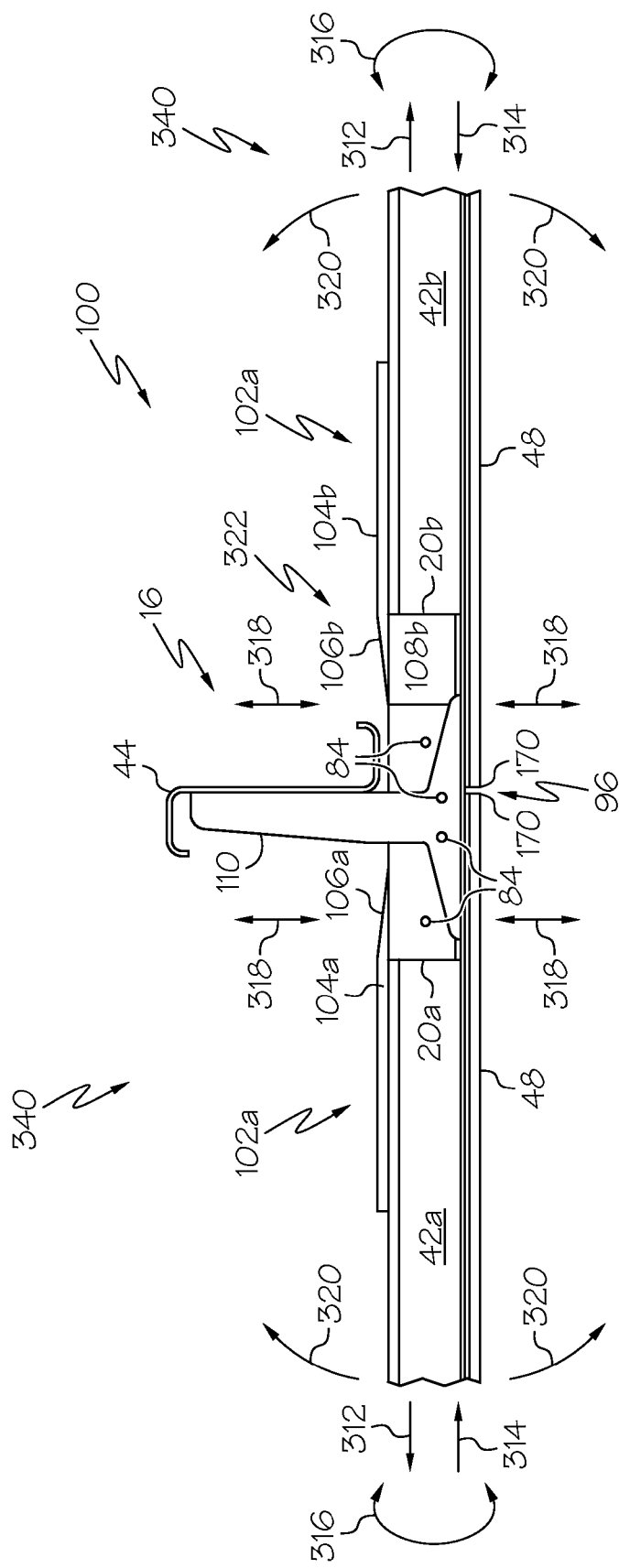
FIG. 24 is a schematic side elevational load diagram of the splice assembly of FIG. 1.
Figure 25:
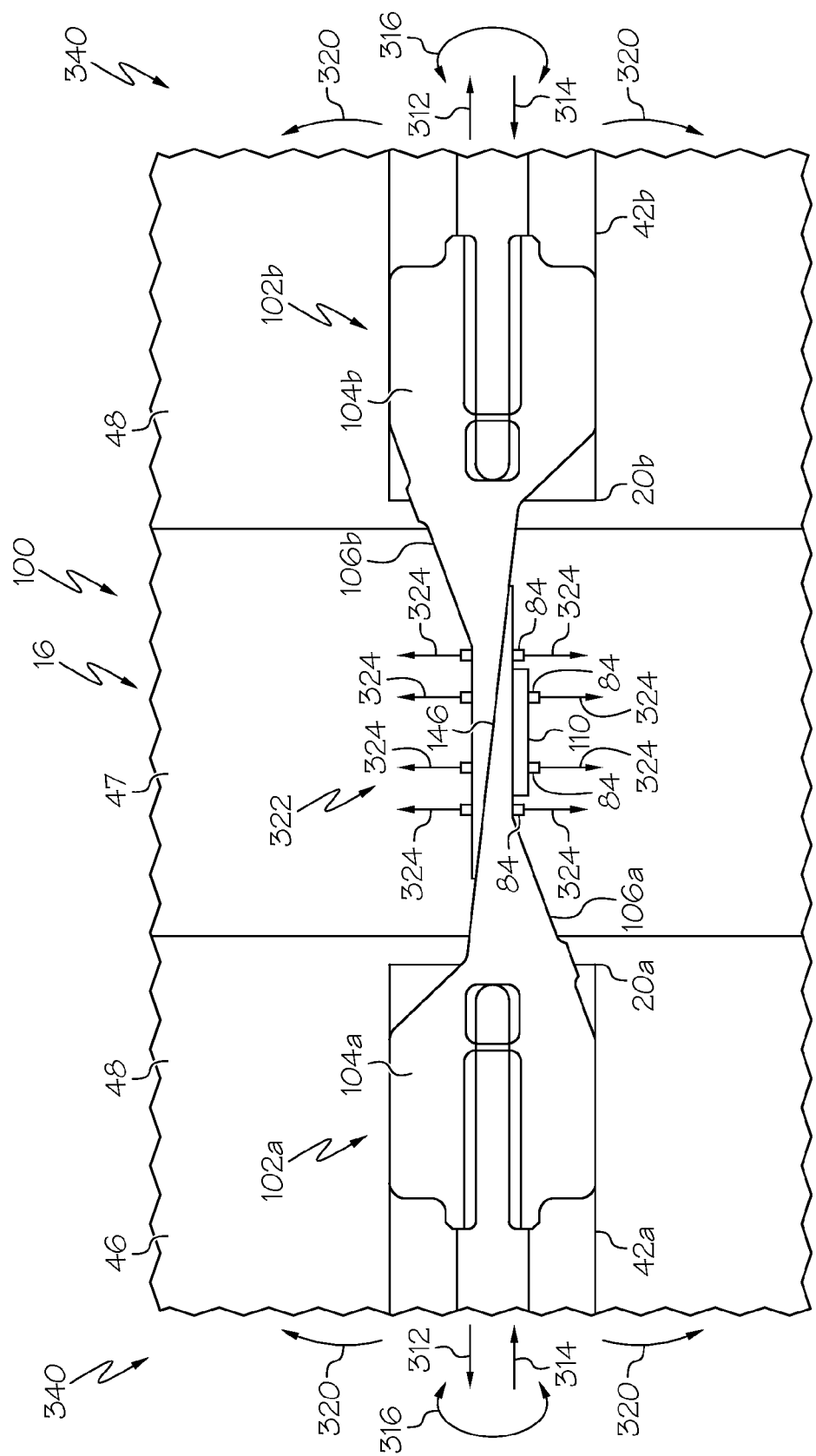
FIG. 25 is a schematic top plan load diagram of the splice assembly of FIG. 1.

Referring to FIGS. 14, 24 and 25, positioning (e.g., moving or sliding) one or both of the splice brackets 102a, 102b relative to the ends 20a, 20b of the associated stringers 42a, 42b (e.g., linearly in the direction of arrows 122 and 124) (FIG. 14) may be optimized for a tension load 312, a compression load 314, a torsion load 316, a shear load 318 and/or a bending load 320 or some combination of loading (FIG. 24) depending on the particular requirements of the application of the splice assembly 100.

As one example, the splice bracket 102 may be optimized in the following order to convey axial compression 314, axial tension 312, and local bending 320 and torsion 316 resulting from splicing the stringers 42 on each side of the splice joint 16. In one example realization, the first splice bracket 102a may be connected to the second splice bracket 102b by fasteners 84 (e.g., bolts) (FIGS. 9A and 9B). The loading on the fasteners 84 may be expressed primarily in shear, but the fasteners are designed to act in tension. The ability to act in tension (e.g., along the fastener centerline) may allow the splice bracket connection 322 to react to the local bending 320 and/or torsion 316 effects or some combination thereof.

In another example realization, there may be an additional load path defined by the skin 46 (e.g., skin panels 48) to the skin splice strap 47 (FIG. 9A). The presence and size of this load path may be influenced by the configuration of the splice brackets 102 and the splice clip 110. However, each load path is designed to act, in limited capability, without the other. Each load path may be independently capable of carrying a varying amount of tension 312, compression 314, shear 318, torsion 316, and/or bending 320 loads or some combination thereof.

The splice clip 110 may be designed to assist the splice brackets 102 to react to loading. As one example, the splice clip 110 may be designed to react to some of the loading from the splice brackets 102a, 102b to the fuselage frame 44 (FIG. 24). For example, the splice clip 110 may assist the splice brackets 102a, 102b (e.g., the splice bracket connection 322) in reacting to torsion 316 and/or bending 320 loads or some combination thereof present in the larger structural components (e.g., the skin panels 48 and/or the stringers 42) across the splice joint 16.

The splice brackets 102 and the splice clip 110 may also be designed to carry the shear loading 318 of the overall structural (e.g., the vehicle 10 of aircraft 22).

In such a manner, a longitudinal connection load (e.g., a tension 312 or compression 314 load) and/or a transverse connection load (e.g., a shear 318 load) may be transferred through the connected splice brackets 102a, 102b (e.g., the splice bracket connection 322) and the splice clip 110 from one stringer 42 to another and an inboard connection load and/or and outboard connection load (e.g., a torsion 316 or bending 320 load) may be transferred through the splice brackets 102a, 102b and the splice clip 110 from the fuselage frame 44 to the connected stringers 42.

Any loads applied through nonaligned 142, 144 stringers 42 connected with the splice brackets 102 may be reacted to through the splice bracket 102 (e.g., the surface area 188 (FIG. 12) of the mating surface 108, the thickness T (FIG. 13) of the mating member 106, the angle Θ (FIG. 13) of the mating surface 108 relative to the longitudinal axis B of the splice bracket 102) and/or the splice clip 110 to be within safety margins.

Referring to FIG. 25, the fasteners 84 (e.g., bolts) used to connect the splice brackets 102a, 102b together and the splice clip 110 to the splice brackets 102a, 102b (e.g., forming the splice bracket connection 322) may also react to an additional tension load 334 applied through a center axis (not shown) of the fasteners 84, for example, in response to a torsion load 316 and/or bending load 320.

Figure 26:
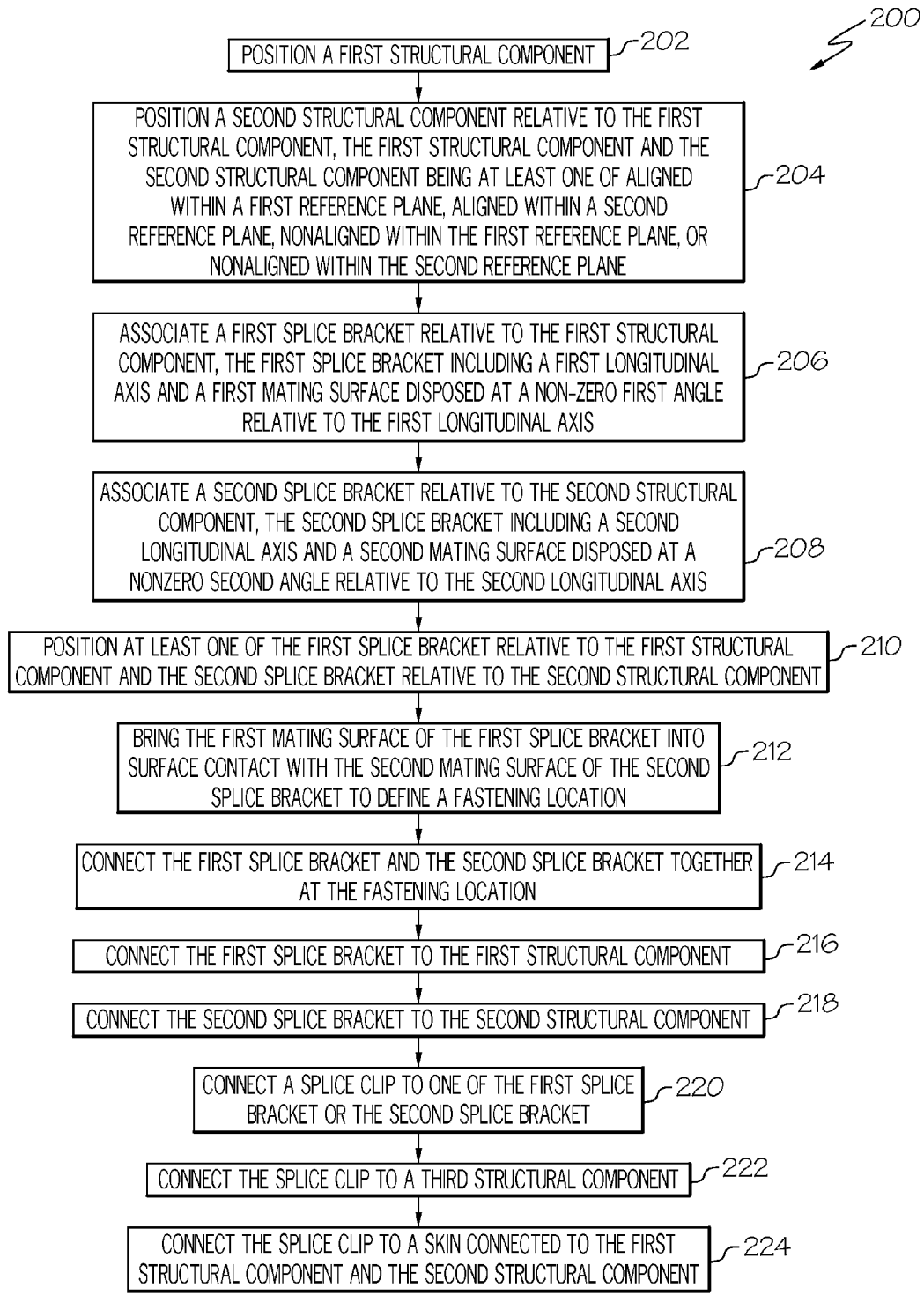
FIG. 26 is a flow diagram of one embodiment of the disclosed method for joining structural components

Referring to FIG. 26, and with reference to FIGS. 1, 2A-4A, 2B-4B, 2C-4C and 2D-4D, one embodiment of the disclosed method, generally designated 200, for joining structural components 18 (e.g., structural components 18 of the shell structure 12) may begin by positioning 98 the first structural component 18a, as shown at block 202. As shown at block 204, the second structural component 18b may be positioned 98 relative to the first structural component 18a.

In one example implementation, the first structural component 18a and the second structural component 18b may be aligned 138 within the reference plane 134 (FIGS. 2C-4C). In another example implementation, the first structural component 18a and the second structural component 18b may be aligned 140 within the reference plane 1364 (FIGS. 2D-4D). In another example implementation, the first structural component 18a and the second structural component 18b may be nonaligned 142 within the reference plane 134 (FIGS. 2A-4A). In another example implementation, the first structural component 18a and the second structural component 18b may be nonaligned 144 within the reference plane 136 (FIGS. 2A-4A). In yet another example implementation, the first structural component 18a and the second structural component 18b may be in some combination of aligned 138, 140 and/or nonaligned 142, 144.

Referring to FIGS. 1, 7 and 9A, 9B, 10 and 11, in one non-limiting realization, the first structural component 18a (FIG. 1) may be the first stringer 42a (FIGS. 9A, 9B, 10 and 11) of the airframe 24 of the aircraft 22 (FIG. 7) (e.g., the shell structure 12 of the vehicle 10) (FIG. 1) and the second structural component 18b may be the second stringer 42b of the airframe 24 of the aircraft 22. As one example construction, the first structural component 18a (e.g., the first stringer 42a) may be proximate, but spaced apart 94 from, the second structural component 18b (e.g., the second stringer 42b).

Referring to FIG. 26, and with reference to FIGS. 1, 2A-4A, 2B-4B, 2C-4C and 2D-4D, the first splice bracket 102a may be associated relative to the end 20a of the first structural component 18a, as shown at block 206. The first splice bracket 102a may include a first longitudinal axis Xa and a first mating surface 108a disposed at a non-zero first angle Θ (FIG. 13) relative to the first longitudinal axis Xa.

As shown at block 208, the second splice bracket 102b may be associated (e.g., positioned) relative to the end 20b of the second structural component 18b. The second splice bracket 102b may include a second longitudinal axis Xb and a second mating surface 108b disposed at a non-zero second angle Θ (FIG. 13) relative to the second longitudinal axis Xb.

As shown at block 210, at least one of the first splice bracket 102a may be positioned (e.g., moved linearly in the direction of directional arrow 122) (FIGS. 3A, 3B, 3C, 3D) relative to the first structural component 18a and/or the second splice bracket 102b may be positioned (e.g., moved linearly in the direction of directional arrow 124) (FIGS. 3A, 3B, 3C, 3D) relative to the second structural component 18b.

As shown at block 212, the first mating surface 108a of the first splice bracket 102a may be brought into surface contact 146 with the second mating surface 108b of the second splice bracket 102b to define the fastening location 162, in response to positioning the first splice bracket 102a and the second splice bracket 102b relative to the first structural component 18a and the second structural component 18b, respectively (block 210).

In one example implementation, the first structural component 18a (e.g., the first stringer 42a) and the second structural component 18b (e.g., the second stringer 42b) may be nonaligned 142, 144 (FIGS. 2A and 2B) within at least one of the first reference plane 134 and the second reference plane 136 (block 204). Bringing the first mating surface 108a and the second mating surface 108b in surface contact 146 (block 210) may include at least one of positioning the first splice bracket 102a (e.g., the first connecting member 104a) relative to an end 20a of the first structural component 18a and/or positioning the second splice bracket 102b (e.g., the second connecting member 104b) relative to an end 20b of the second structural component 18b (block 212). Positioning at least one of the first splice bracket 102a relative to the first structural component 18a and/or the second splice bracket 102b relative to the second structural component 18b (block 212) may account for different magnitudes of nonalignment of the first structural component 18a and the second structural component 18b in at least one of the first reference plane 134 and/or the second reference plane 136.

As one example, at least one of the first splice bracket 102a relative to the end 20a of the first structural component 18a and/or the second splice bracket 102b relative to the end 20b of the second structural component 18b may be positioned (e.g., moved linearly in the direction of directional arrows 122, 124) (block 212) to surface contact 146 the first mating surface 108a of the first splice bracket 102a and the second mating surface 108b of the second splice bracket 102b to define the fastening location 162 (block 210). Positioning the first splice bracket 102a and/or the second splice bracket 102b (e.g., moving linearly in the direction of directional arrows 122, 124) (block 212) to bring the first mating surface 108a and the second mating surface 108b in surface contact 146 (block 210) may account for nonalignment 142, 144 (e.g., different magnitudes of nonalignment) of the first structural component 18a and the second structural component 18b.

As shown at block 214, the first splice bracket 102a and the second splice bracket 102b may be connected (fastened) together (e.g., by fasteners 84) (FIGS. 9A and 9B) at the fastening location 162. As one example, fasteners 84 may be connected through the first mating member 106a of the first splice bracket 102a and the second mating member 106b of the second splice bracket 102b at the fastening location 162 defined by the surface contact 146 between the first mating surface 108a and the second mating surface 108b. Upon positioning the first splice bracket 102a and/or the second splice bracket 102b (e.g., moving linearly in the direction of directional arrows 122, 124) (block 212) to surface contact 146 the first mating surface 108a and the second mating surface 108b (block 210), the mating members 106a, 106b may define the fastening location 162 for connecting the first splice bracket 102a and the second splice bracket 102b.

As shown at block 216, the first splice bracket 102 may be connected (e.g., fastened) to the first structural component 18a (e.g., by fasteners 198) (FIGS. 9A and 9B). As shown at block 218, the second splice bracket may be connected (e.g., fastened) to the second structural component (e.g., by fasteners 198) (FIGS. 9A and 9B).

Referring to FIG. 26, and with reference to FIGS. 1 and 14, in one example implementation, the position of the first splice bracket 102a relative to the first structural component 18a (e.g., to the end 20a of the first structural component 18a) and/or the position of the second splice bracket 102b relative to the second structural component 18b (e.g., to the end 20b of the second structural component 18b) may be equalized by substantially centering the ends 20a, 20b of the structural components 18a, 18b within the positioning features 152a, 152b (e.g., within boundary 328 defined between the forward edge 324 and rear edge 326 of the positing feature 152) (FIG. 13) of the splice brackets 102a, 102b prior to connecting the splice brackets 102a, 102b to the structural components 18a, 18b.

Referring to FIG. 26, and with reference to FIGS. 9A, 9B and 23, in one example implementation, connecting the first splice bracket 102a to the first structural component 18a (block 214) and/or connecting the second splice bracket 102b to the second structural component 18b (block 216) may include clamping the splice bracket 102 to the structural component 18 with the tooling fixture 300 (FIG. 23); coordinating and locating fastening holes 196 defined by the position-locating holes 304 of tooling fixture 300; machining the fastening holes 196 through the splice bracket 102 and the structural component 18; and installing fasteners 198 within the fastening holes 196 to connect the splice bracket 102 to the structural component 18 (not shown in FIG. 26).

Referring to FIG. 26, and with reference to FIGS. 1, 2A-4A, 2B-4B, 2C-4C, 2D-4D and 9-11, the splice clip 110 may be connected (e.g., fastened) to at least one of the first splice bracket 102a and/or the second splice bracket 102b, as shown at block 220.

As shown at block 222, the splice clip 110 may be connected (e.g., fastened) to the third structural component 18c to form the splice assembly 100.

As shown at block 224, the splice clip 110 may be connected (e.g., fastened) to the skin 90 (e.g., skin 46) (FIG. 9A) connected to at least one of the first structural component 18a and/or the second structural component 18b to form the splice assembly 100.

In one non-limiting realization, the third structural component 18c may be the circumferential fuselage frame 44 of the airframe 24 of the aircraft 22. A plurality of splice assemblies 100 may define the splice joint 16 between fuselage sections 40 (e.g., between shell structures 12) (FIG. 1) forming the fuselage 38 of the aircraft 22 or between skin panels 48 forming the fuselage section 40 or fuselage 38 of the aircraft 22.

Figure 27:
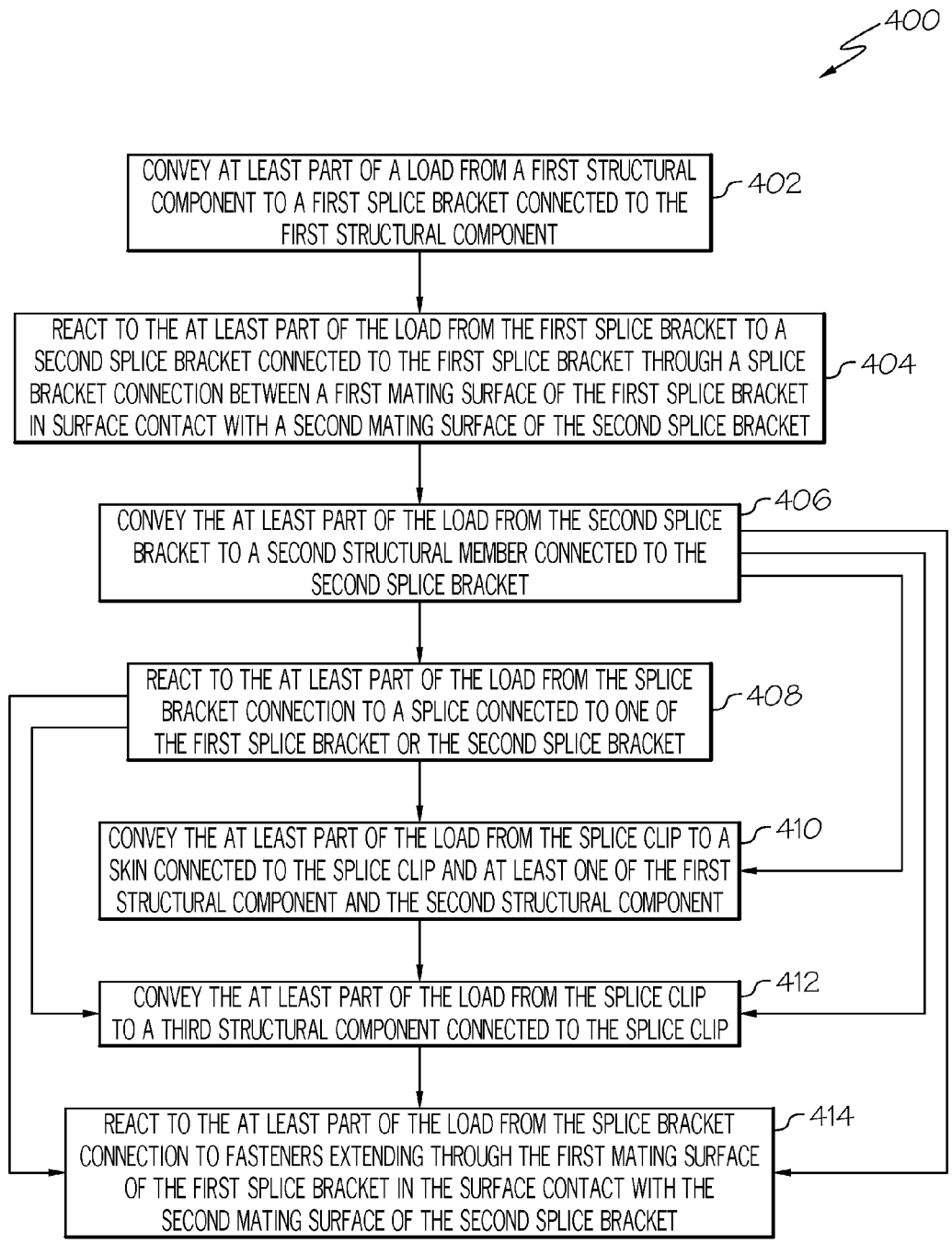
FIG. 27 is a flow diagram of one embodiment of the disclosed method for directing a load through structural components of a shell structure.

Referring to FIG. 27, and with reference to FIGS. 1, 2A-4A, 2B-4B, 2C-4C, 2D-4D, 24 and 25, one embodiment of the disclosed method, generally designated 400, for directing a load through structural components 18 (e.g., stringer 42) of the shell structure 12 may begin by conveying at least part of the load 340 (e.g., tension load 312, compression load 314, torsion load 316, shear load 318, bending load 320 and/or tension load 334) (FIGS. 24 and 25) from the first structural component 18a (e.g., the first stringer 42a) to the first splice bracket 102a connected to the first structural component 18a, as shown at block 402.

As shown at block 404, at least part of the load 340 may be reacted from the first splice bracket 102a to the second splice bracket 102b connected to the first splice bracket 102a through the splice bracket connection 322 between the first mating surface 108a of the first splice bracket 102a in surface contact 146 with the second mating surface 108b of the second splice bracket 102b.

As shown at block 406, at least part of the load 340 may be conveyed from the second splice bracket 102b to the second structural component 18b (e.g., the second stringer 42b) connected to the second splice bracket 102b.

As shown at block 408, at least part of the load 340 may be reacted from the splice bracket connection 322 to the splice clip 110 connected to one of the first splice bracket 102a or the second splice bracket 102b.

As shown at block 410, at least part of the load 340 may be conveyed from the splice clip 110 to the skin 90 (e.g., skin 46) connected to the splice clip 110 and at least one of the first structural component 18a and/or the second structural component 18b.

As shown at block 412, at least part of the load 340 may be conveyed from the splice clip 110 to the third structural component 18c (FIG. 1) (e.g., the fuselage frame 44) (FIG. 24) connected to the splice clip 110.

As shown at block 414, at least part of the load 340 may be reacted from the splice bracket connection 322 to fasteners 84 extending through the first mating surface 108a (e.g., through the first mating member 106a) of the first splice bracket 102a in surface contact 146 with the second mating surface 108b (e.g., the second mating member 106b) of the second splice bracket 102b.

Although various embodiments of the disclosed apparatus and methods have been shown and described, modifications may occur to those skilled in the art upon reading the specification. The present application includes such modifications and is limited only by the scope of the claims.

What is claimed is:

1. A pair of splice brackets for joining a pair of structural components, each splice bracket of said pair of splice brackets comprising:
a longitudinal axis;
a connecting member configured to be connected to an end of one of said pair of structural components; and
a mating member extending from said connecting member along said longitudinal axis, said mating member comprising a mating surface disposed at a non-zero angle relative to said longitudinal axis,
wherein a first connecting member of a first splice bracket of said pair of splice brackets connects to a first end of a first structural component of said pair of structural components and a second connecting member of a second splice bracket of said pair of splice brackets connects to a second end of a second structural component of said pair of structural components, being positioned end-to-end and non-aligned with said first structural component, with a first mating surface of a first mating member of said first splice bracket and a second mating surface of a second mating member of said second splice bracket in direct surface contact to join said first structural component and said second structural component together, and
wherein an axial position of at least one of said first splice bracket and said second splice bracket relative to each other and a respective end of at least one of said first structural component and said second structural component is variable to determine said direct surface contact and account for different magnitudes of non-alignment between said first structural component and said second structural component.

2. The pair of splice brackets of claim 1 wherein said non-zero angle comprises approximately between a 1-degree and 89-degree angle.

3. The pair of splice brackets of claim 1 wherein:
said non-zero angle of said first mating surface of said first splice bracket and said second mating surface of said second splice bracket are complimentary, and
said first mating member of said first splice bracket and said second mating member of said second splice bracket are connected together.

4. The pair of splice brackets of claim 1 wherein said mating surface defines one of a top surface or a bottom surface of said mating member.

5. The pair of splice brackets of claim 1 wherein said mating surface defines one of a first side surface or a second side surface of said mating member.

6. The pair of splice brackets of claim 1 wherein each splice bracket of said pair of splice brackets further comprises:

an indexing feature, wherein said indexing feature repeatedly positions a tooling fixture relative to said splice bracket and said one of said pair of structural components; and
a positioning feature disposed between said connecting member and said mating member, wherein said positioning feature defines a visual marker of a position of said splice bracket relative to said end of said one of said pair of structural components.

7. The splice bracket of claim 1 wherein said first one of said structural component and said second one of said structural component are nonaligned in at least one of a first reference plane and a second reference plane.

8. A splice assembly comprising:
a first splice bracket comprising:
a first longitudinal axis;
a first connecting member, wherein said first connecting member connects said first splice bracket to an end of a first structural component; and
a first mating member extending from said first connecting member along said first longitudinal axis, said first mating member comprising a first mating surface disposed at a non-zero first angle relative to said first longitudinal axis; and
a second splice bracket comprising:
second longitudinal axis;
a second connecting member, wherein said second connecting member connect said second splice bracket to an end of a second structural component positioned end-to-end and non-aligned with said first structural component; and
a second mating member extending from said second connecting member along said second longitudinal axis, said second mating member comprising a second mating surface disposed at a non-zero second angle relative to said second longitudinal axis,
wherein:
said first mating surface and said second mating surface are complementary and are positioned in direct surface contact with one another,
said direct surface contact between said first mating surface and said second mating surface defines a fastening location for connecting said first splice bracket and said second splice bracket to join said first structural component and said second structural component together, and
at least one of a first axial position of said first splice bracket relative to said second splice bracket and said end of said first structural component and a second axial position of said second splice bracket relative to said first splice bracket and said end of said second structural component is variable to determine said direct surface contact between said first mating surface and said second mating surface and account for different magnitudes of nonalignment between said first one of said structural component and said second one of said structural component.

9. The splice assembly of claim 8 wherein said first structural component and said second structural component are aligned within at least one of a first reference plane and a second reference plane.

10. The splice assembly of claim 8 wherein said first structural component and said second structural component are nonaligned within at least one of a first reference plane and a second reference plane.

11. The splice assembly of claim 8 further comprising a splice clip connected to one of said first splice bracket or said second splice bracket, and wherein said splice clip connects to a third structural component and a skin connected to said first structural component and said second structural component.

12. The splice assembly of claim 8 wherein said first mating surface defines a top surface of said first mating member and said second mating surface defines a bottom surface of said second mating member.

13. The splice assembly of claim 8 wherein said first mating surface defines a first side surface of said first mating member and said second mating surface defines a second side surface of said second mating member.

14. The splice assembly of claim 8 wherein said first structural component and said second structural component are nonaligned in both a first reference plane and a second reference plane.

15. The splice assembly of claim 8 wherein said non-zero first angle comprises between approximately 3-degrees and approximately 15-degree angle, and wherein said non-zero second angle is complementary to said non-zero first angle and comprises between approximately 3-degrees and approximately 15-degree angle.

16. A splice joint comprising:
a first structural component comprising a first structural component-end;
a second structural component comprising a second structural component-end, wherein said first structural component and said second structural component are nonaligned and positioned end-to-end, and wherein said first structural component-end and said second structural component-end are adjacent to one another;
a first splice bracket comprising:
a first longitudinal axis;
a first connecting member connected to said first structural component-end; and
a first mating member extending from said first connecting member along said first longitudinal axis, said first mating member comprising a first mating surface disposed at a non-zero first angle relative to said first longitudinal axis; and
a second splice bracket comprising:
second longitudinal axis;
a second connecting member connected to said second structural component-end; and
a second mating member extending from said second connecting member along said second longitudinal axis, said second mating member comprising a second mating surface disposed at a non-zero second angle relative to said second longitudinal axis,
wherein:
said first mating surface and said second mating surface are complementary and are in direct surface contact with one another,
said first splice bracket and said second splice bracket are connected together through said first mating member and said second mating member at a fastening location defined by said direct surface contact between said first mating surface and said second mating surface to join said first structural component and said second structural component together, and
at least one of a first axial position of said first splice bracket relative to said second splice bracket and said end of said first structural component and a second axial position of said second splice bracket relative to said first splice bracket and said end of said second structural component is variable to determine said direct surface contact between said first mating surface and said second mating surface and account for different magnitudes of nonalignment between said first one of said structural component and said second one of said structural component.

17. The splice joint of claim 16 wherein said first structural component and said second structural component are nonaligned within at least one of a first reference plane and a second reference plane.

18. The splice joint of claim 16 wherein said first structural component comprises a first foot connected to a first skin, a first web extending from said first foot, and a first flange extending from said first web, and wherein said first connecting member is connected to only said first web and said first flange.

19. The splice joint of claim 16 further comprising:
a skin connected to said first structural component and said second structural component;
a third structural component; and
a splice clip connected to one of said first splice bracket or said second splice bracket and said third structural component.

20. The splice joint of claim 19 wherein said first structural component and said second structural component each comprises a stringer of an airframe of an aircraft, and wherein said third structural component comprises a fuselage frame of said airframe of said aircraft.

21. The splice joint of claim 16 wherein said first structural component and said second structural component are nonaligned in both a first reference plane and a second reference plane.

* * * * *

UNITED STATES PATENT AND TRADEMARK OFFICE
CERTIFICATE OF CORRECTION

PATENT NO. : 9,586,667 B2
APPLICATION NO. : 14/557812
DATED : March 7, 2017
INVENTOR(S) : Reeves It is certified that error appears in the above-identified patent and that said Letters Patent is hereby corrected as shown below:

In the Drawings

Sheet 1, Fig. 1, replace reference numeral "108b" designating the mating surface of the first splice bracket 102a with reference numeral --108a--.

Sheet 1, Fig. 1, replace reference numeral "106a" designating the mating member of the second splice bracket 102b with reference numeral --106b--.

Sheet 1, Fig. 1, replace reference numeral "108a" designating the mating surface of the second splice bracket 102b with reference numeral --108b--.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*